United States Patent [19]
Ha et al.

[11] Patent Number: 5,557,583
[45] Date of Patent: Sep. 17, 1996

[54] TRANSDUCER TO GENERATE PHASE-ENCODED WAVEFIELDS

[76] Inventors: Stephen T. Ha, 10855 Meadowglen La. #710; Norman S. Neidell, 2929 Briarpark, Ste. 125, both of Houston, Tex. 77042

[21] Appl. No.: 300,643

[22] Filed: Sep. 2, 1994

[51] Int. Cl.$^6$ .................................................. G01S 15/00
[52] U.S. Cl. ..................... 367/138; 367/103; 367/105
[58] Field of Search .................................... 367/48, 87, 99, 367/100, 101, 102, 103, 105, 137, 138; 342/82, 86, 147

[56] References Cited

U.S. PATENT DOCUMENTS

| | | | |
|---|---|---|---|
| Re. 31,509 | 1/1984 | Neidell | 367/100 |
| 3,611,401 | 10/1971 | Connolly | 367/138 |
| 4,315,263 | 2/1982 | Neidell | 367/100 |
| 4,745,402 | 5/1988 | Auberbach | 340/709 |

OTHER PUBLICATIONS

Ha, SEG 60th Annual International Meeting Expanded Abstract, pp. 878–880, 1990.
Kinsler, *Fundamentals of Acoustics*, Directional Factor and Beam Patterns, 8.7 pp. 163, 164, 175, 1982.
Sheriff, *Exploration Seismology*, 1:121, 1982.
Trorey, Geophysics, 35:762–784, 1970.
Trorey, Geophysics, 42:1177–1182, 1977.

*Primary Examiner*—Ian J. Lobo
*Attorney, Agent, or Firm*—Pravel, Hewitt, Kimball & Krieger

[57] ABSTRACT

A transducer capable of generating a phase-encoded wavefield is described. The encoded phase is related to the angular co-ordinates of direction of transmission. By decoding the phase values of the received wavefield, a direction can be obtained. Therefore, in navigation applications this transmitter gives additional location information not available from a single received signal using traditional methods such as "range-range" and "hyperbolic" systems. In its simplest configuration, the new transducer comprises two transducers which can be individually controlled. In more complex constructions use of more than two transducers increases the controllability of the desired phase characteristics of the resulting wavefield.

It has also been discovered that by using two different phase-encoded wavefields, direction finding of small reflectors can not only be accomplished, but small reflectors can be distinguished from large plane reflectors or else dispersive properties of the propagation medium can be characterized. The first wavefield takes the form of monotonic phase increments with direction as for example would be produced by the present invention, while the second wavefield simply reverses the sense of phase increments of the first. The second wavefield is easily obtained from a source that generates the first either by reprogramming the electronic driving signals for transducers or mechanically interchanging the components of the transducers.

43 Claims, 31 Drawing Sheets

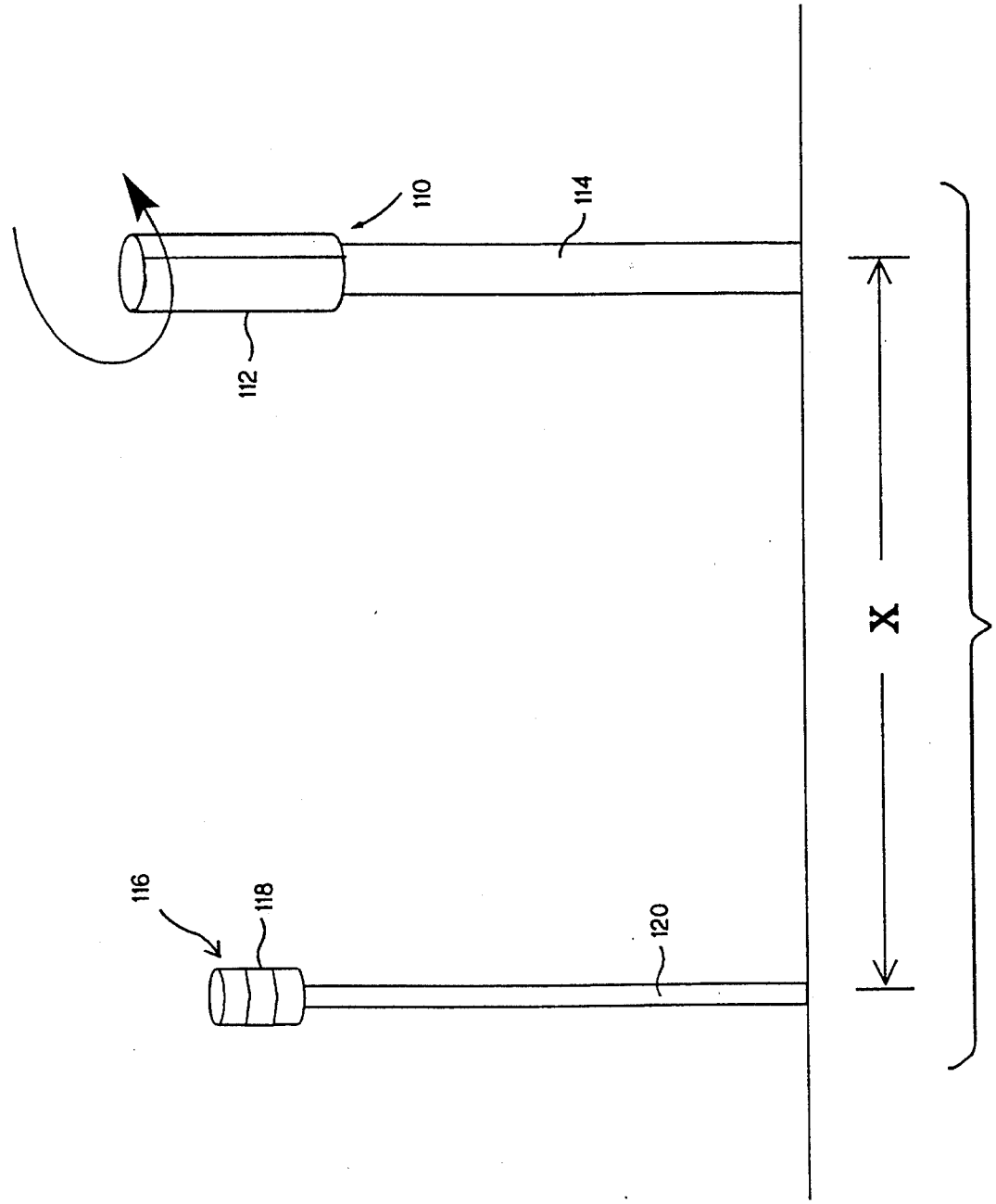

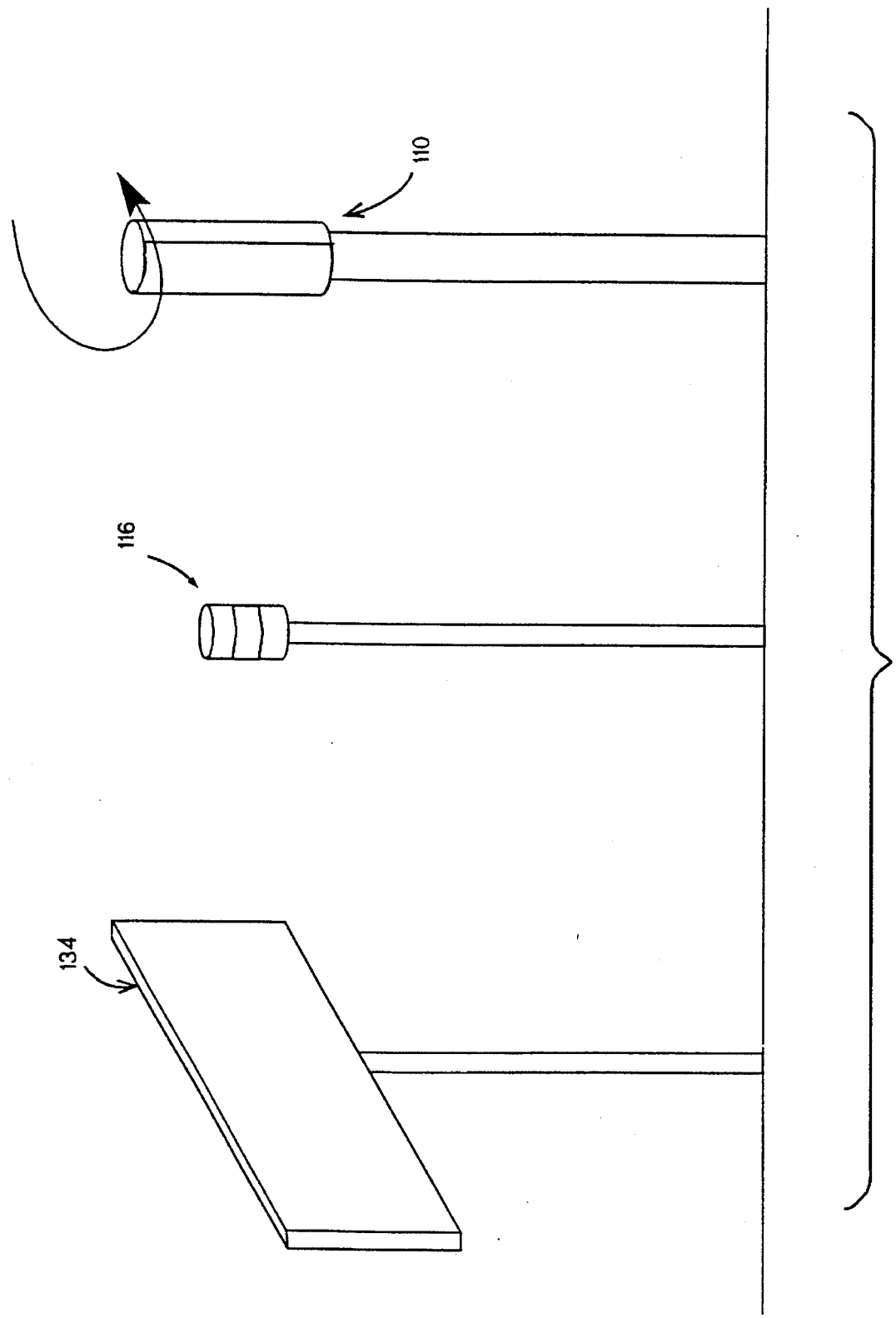

Wavelet recorded directly

Echo from a small circular disc (3.3 cm diameter)

Wavelet recorded directly

Echo from a small rectangular plate (1.8x3.6cm)

TRANSDUCER TO GENERATE PHASE-ENCODED WAVEFIELDS

BACKGROUND OF THE INVENTION

U.S. Pat. No. 4,315,263 of applicant Neidell, which reissued as U.S. Pat. No. Re. 31,509, describes an echo location system where phase is encoded into a wavefield according to the direction of transmission. This allows solution for the direction of travel path from the signal phase, so that one may echo locate with a single source and receiver. The time of signal travel gives the radial distance to the target, and the phase gives angular co-ordinates.

In marine navigation or towed marine streamer positioning, triangulation is often used to solve for a position. In extreme weather conditions, a partial loss of signals results in ambiguous solutions. In marine streamer location using acoustic methods, bubbles from an air-gun seismic source can introduce serious uncertainties in range values (see Ha, *SEG 60th Annual International Meeting Expanded Abstract*, pp. 878–880, 1990). Should the Neidell method be incorporated, one would gain additional information by knowing the direction of transmission. This extra data could very well compensate for the loss of other data thus increasing the reliability of a navigation or positioning system with many benefits depending on the particular application.

The Neidell method also allows one to image with a coincident source and receiver and is suitable where space is limited or where transducers can only be placed at certain locations. Such limitations can be found for example in a wellbore and this method becomes advantageous should one consider the task of imaging ahead and around while drilling through subsurface formations. Acoustic imaging while drilling would have important contributions: one being control of drilling direction, and another evaluation of formations not yet encountered.

In horizontal drilling, for example, one must avoid sudden bends in the drilling path if the bedding dip changes (see Martin in *The Leading Edge*, Vol. 11, No. 8, pp. 21–26, 1992). Therefore, adjustments in the drilling trajectory need to be made well in advance to anticipate changes of dip. Acoustic reflections from rocks reveal different physical properties from those obtained using electromagnetic and radiation methods of measurement. Acoustic reflections thus contribute further information about formations not yet penetrated. Additionally, hazards to the drilling may be detected well in advance so proper precautions may be applied.

Although the Neidell method was proposed a decade ago, so far as is known it has not been yet implemented as a commercial product. One problem has been the generation of signals whose phase can be controlled to change with direction.

Echoes received from small reflectors have been found to be significantly distorted in phase compared to the original impinging wavefield. Similarly, certain propagation media can cause phase distortion in the signals in transit. Such distortions would normally cause a problem if a phase-encoded wavefield is utilized for direction finding with a single source and receiver.

SUMMARY OF THE INVENTION

Briefly, the present invention provides a new and improved transducer capable of generating a wavefield whose encoded phase varies with transmission direction. In the simplest configuration, the transducer according to the present invention includes a transmitter transducer pair, or two individually driven transducers. The operating principle requires that the phase of the wavefield which can be transmitted vary as a function of direction about a reference point substantially in the manner described in U.S. Patent No. Re. 31,509.

For a first one of the transmitter transducer pair, as one moves away angularly off its acoustic axis, the amplitude of its wavefield response decreases. The contribution or "influence" of that transmitter transducer to any wavefield also decreases. Therefore, in the direction near to the acoustic axis of the first transmitter transducer, its influence is great, and the phase function in this direction is substantially the phase function of the first transducer of the pair. Similar considerations hold for the second transmitter transducer. It can therefore be understood that the phase of a resultant wavefield changes from the phase function of the first transmitter transducer to the phase function of the second as one moves angularly between their acoustic axes.

A transducer composed of two individually driven transmitters transducers is the most elementary embodiment of the present invention. The controllability of the wavefield phase over a given angular window is limited by the changes in the control signals. However if more transducers are added, or else one uses transducers of designed heterogeneous character, one can exercise even greater control over the desired phase characteristics.

The present invention further utilizes the directionally phase-encoded wavefield generated with a single source and receiver to find the directions of objects capable of causing phase distortions in the reflected echoes, or else in propagation media which also impart phase distortions. In particular, small targets of a size to cause negligible directional phase variation over their surfaces can introduce diffraction effects at their edges, resulting in noticeable constant phase wavefield distortions.

Objects such as large plane reflecting surfaces do not cause phase distortion. Nevertheless they can return reflections with phase distortions resulting from the propagation medium. Therefore, the present invention provides a means of finding the direction of small targets and large plane reflecting surfaces even in the presence of other phase distortions. Where there are no propagation phase effects and because small objects introduce significant phase distortion whereas large plane surfaces do not, one can easily distinguish between the two. In fact, for objects of similar shape, diffraction effects become more pronounced as the dimension of the object diminishes, and one may obtain a heuristic feel of the size of the object by the amount of phase distortions under such conditions.

Achievement of these objectives is realized by recording the echoes from a target with two different but independent directionally phase-encoded wavefields. Here one can consider a first wavefield type which increases the directional phase monotonically with the bearing angle. A second wavefield reverses the sense in which the phase increases. For a source capable of generating such wavefields, phase reversal can be obtained by either (a) an electronic means for reprogramming the signals driving the transmitter transducer pair, or (b) a mechanical means which simply reverses the entire transmitter.

BRIEF DESCRIPTION OF THE DRAWINGS

FIGS. 14(a) and 14(b) are isometric views of test equipment configurations for transducers according to the present invention.

DETAILED DESCRIPTION OF THE INVENTION

With the present invention, it has been found that an effective transducer amplitude response may change with direction but if it does so in known manner, corrections may be applied once direction is established. In practice, after suitable compensation, the desired behavior is exhibited. For brevity of reference, a wavefield with characteristics according to U.S. Pat No. Re. 31,509 whose phase varies with direction is referred to in the present application as "Neidlian." The disclosure of U.S. Pat. No. Re. 31,509 is herein incorporated by reference.

Although both a Neidlian wavelet from a Neidlian wavefield and a mildly dispersed wavelet have a common property of wavelet distortion, the Neidlian wavelet does not necessarily result only from a change in velocity with frequency as a dispersed wavelet does. It is known for example that post-critical angle reflections also have a similar phase property. An ideal Neidlian wavefield is thus defined as one whose wavelet phase function varies by constant amounts with direction across its bandwidth relative to some time origin. Its amplitude response however remains unchanged at equal radial distances from the wavefield origin.

It is helpful to first describe a wavelet or "click" and understand that a transducer according to the present invention has the desired effect of producing a signal which by some simple operations may be transformed into a Neidlian wavelet, a compact or "short" duration signal composed of a smoothly unimodal and continuous but limited band of frequencies.

Figure 1:
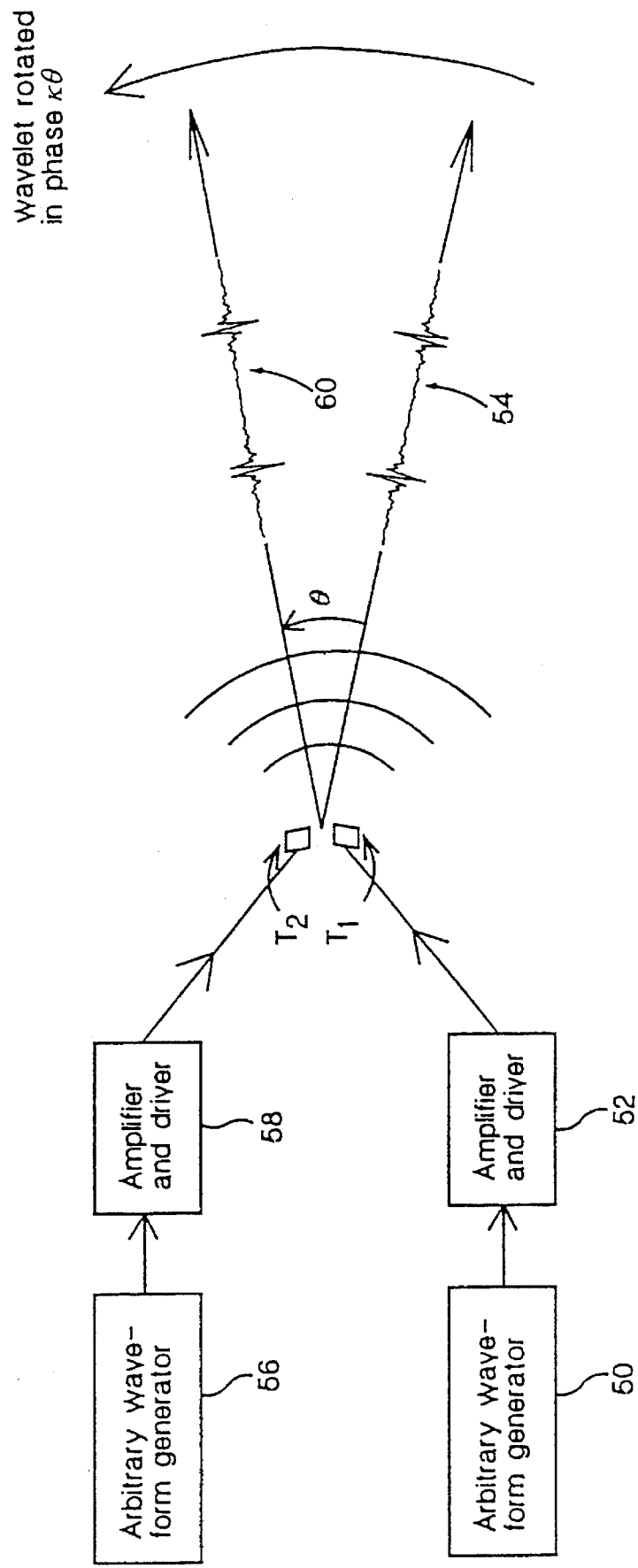
FIG. 1 is a schematic diagram of an echo-location system with a transducer according to the present invention.

A simple diagram illustrating the generation of the Neidlian wavefield of the present invention is shown in FIG. 1. A transmitter transducer $T_1$ receives a waveform, which may be of any suitable arbitrary nature or characteristics described below, formed in a waveform generator 50 after suitable increase in power from an amplifier and driver 52. The transducer $T_1$ emits a Neidlian wavefield with a wavelet exemplified at 54 which includes some minimal interference from the corresponding wavefield of transmitter transducers $T_2$. Similarly, a transmitter transducer $T_2$ receives a waveform of like characteristics from generator 56 from an amplifier and driver section 58, emitting a Neidlian wavefield with a wavelet exemplified at 60 again with a small contribution from $T_1$. It can easily be seen from FIG. 1 that the shape of the wavefield/wavelet changes with direction θ between wavelets 54 and 60. From another viewpoint, the change in wavelet shape is due solely to the change in its constant phase angle κθ where κ is a constant.

Figure 2:
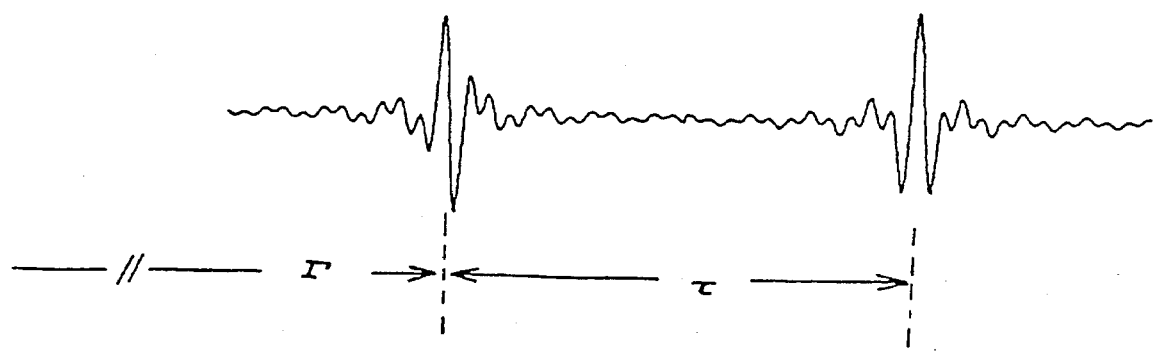
FIG. 2 is a waveform diagram of a phase-encoded wavelet.

Mathematically, the Fourier transform of the wavelet in a particular direction for the wavefield at some radial distance is $$Z(\omega,\theta)=F(\omega)e^{j\kappa\theta}e^{-j\omega\Gamma}\{e^{j\pi/2}+e^{-j\omega\tau}\}, \quad \omega>0. \tag{1}$$

where ω is the angular frequency, θ is the angular co-ordinate, and κ is a constant. τ and Γ are illustrated in FIG. 2, where a double-click Neidlian wavelet is a combination of the inverted sine modulated sinc function and the cosine modulated sinc function, separated by a time τ. The inverted sine modulated sinc function is centered at time Γ.

$F(\omega)e^{j\kappa\theta}$ is the Fourier transform of the cosine modulated sinc function C·f(t) with phase angle κθ over the positive frequencies. C is constant at a given radial distance.

$$C \cdot f(t) = C \frac{\Delta\omega}{\pi} \, \text{sinc}\left(\frac{\Delta\omega t}{2\pi}\right) \cos(\omega_c t + \kappa\theta), \tag{2}$$

where $\text{sinc}(x) \equiv [\sin(\pi x)]/(\pi x)$, $\omega_2$ and $\omega_1$ are the high and the low frequency limits respectively, and $$\Delta\omega=\omega_2-\omega_1, \ \omega_c=(\omega_2+\omega_1)/2, \text{ and } \omega_2>\omega_1. \tag{3}$$

Equation (2) has the amplitude and phase spectrum respectively as follows:

$$|F(\omega)| = \begin{cases} C, & \omega_1 < |\omega| < \omega_2, \\ C/2, & |\omega| = \omega_2, \text{ or } |\omega| = \omega_1, \\ 0, & \text{otherwise,} \end{cases} \quad (4)$$

$$arg\{F(\omega)\} = \begin{cases} \kappa\theta, & \omega > 0, \\ 0, & \omega = 0, \\ -\kappa\theta, & \omega < 0. \end{cases}$$

The amplitude spectrum is constant in between the high-cut and the low-cut frequencies, $\omega_2$ and $\omega_1$, respectively.

From equation (1), it can be seen that the wavelet is similar in all directions except for the term $\exp(j\kappa\theta)$. Therefore the effect of the angular co-ordinate $\theta$ is to introduce a constant phase shift of $\kappa\theta$ at all transmitted frequencies.

This is the heart of what can be called an ideal Neidlian wavefield. To distinguish the phase function $\kappa\Gamma$ from a phase shift arising due to the distance traversed from a reference origin, $\kappa\Gamma$ is termed the directional phase.

Figure 3:
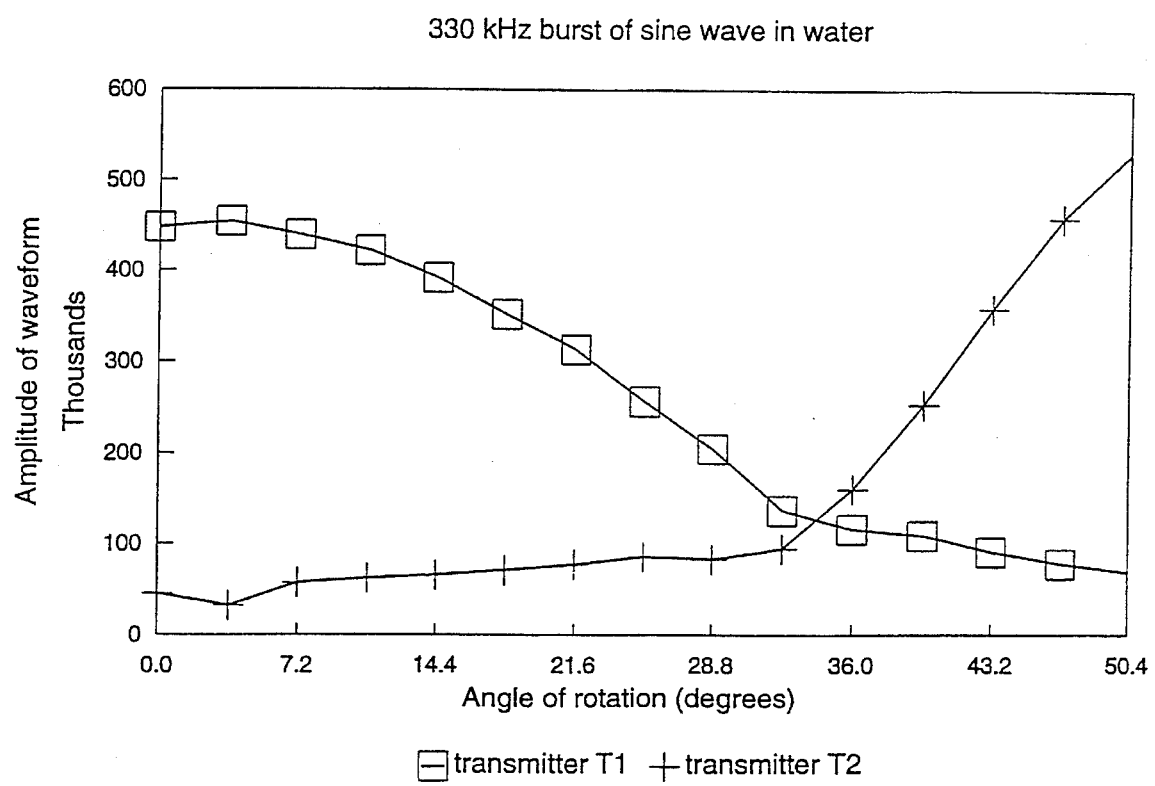
FIG. 3 is a plot of amplitude responses as a function of angle of rotation for the individual two transmitter transducers of a pair comprising a transducer according to the present invention.
Figure 4:
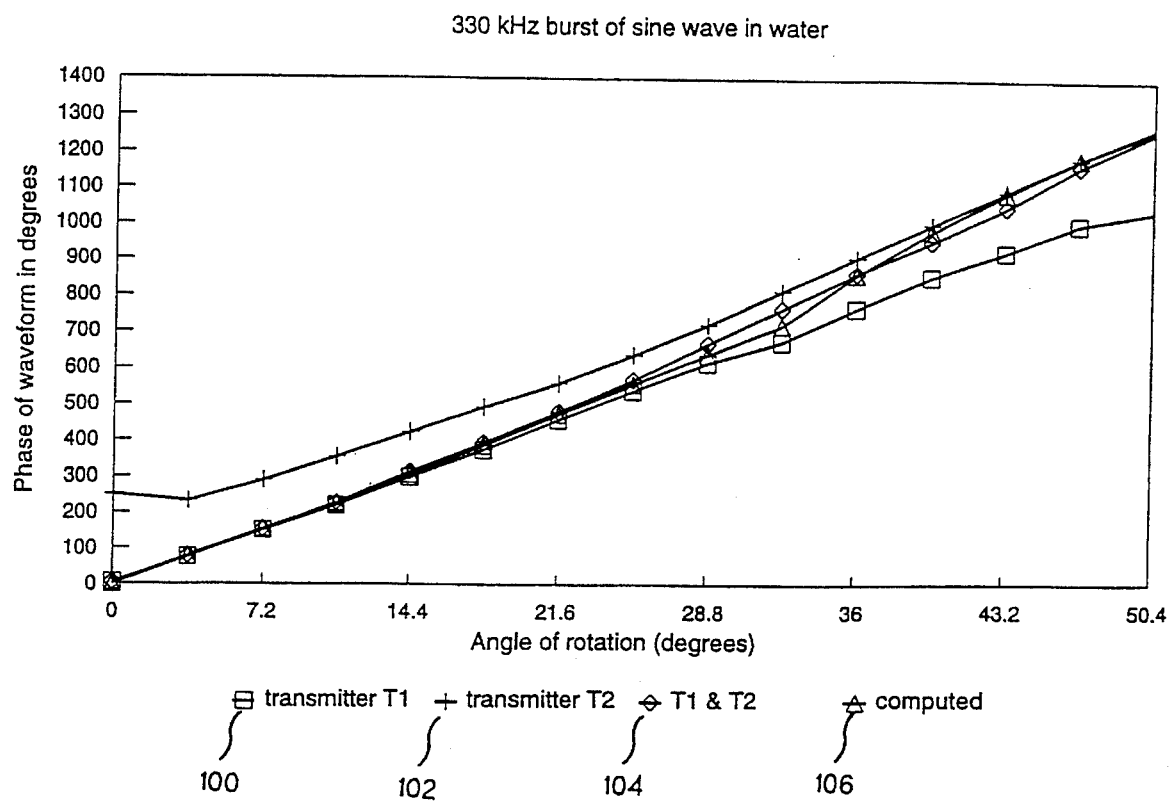
FIG. 4 is a plot of composite phase response as a function of angle of rotation for a transducer composed of a transmitter transducer pair according to the present invention.

The addition of two wavefields having different phase functions to generate a phase function varying according to the direction of transmission is illustrated in the following simple embodiment. Two ultrasonic transmitter transducers $T_1$ and $T_2$ have signal wavefields which are to be combined. Their respective amplitudes vary with a co-ordinate that describes the angle of rotation as shown in FIG. 3. Measured constant phases versus the angles of rotation are shown in FIG. 4 for a 330 kHz component which is the dominant frequency used in generating the "burst" of sine wave signals to drive both transducers $T_1$ and $T_2$. The phase at this single frequency is referred to a common time origin.

A "square" symbol 100 and a "plus" symbol 102 in FIG. 4 correspond to measurements for transmitters $T_1$ and $T_2$, respectively. "Diamond" symbols 104 represent the phase of the resultant wavefield when both transmitters $T_1$ and $T_2$ are turned on. It can be seen that the resultant wavefield changes from approximating transmitter $T_1$ values to transmitter $T_2$ values as the angle of rotation $\theta$ increases. This is expected as at the smaller angles of rotation the influence of $T_1$ is greatest while at the higher angles of rotation the influence of $T_2$ is greatest. A "triangular" symbol 106 represents an ideal computed phase of the resultant wavefield from the individually measured components.

Figure 5:
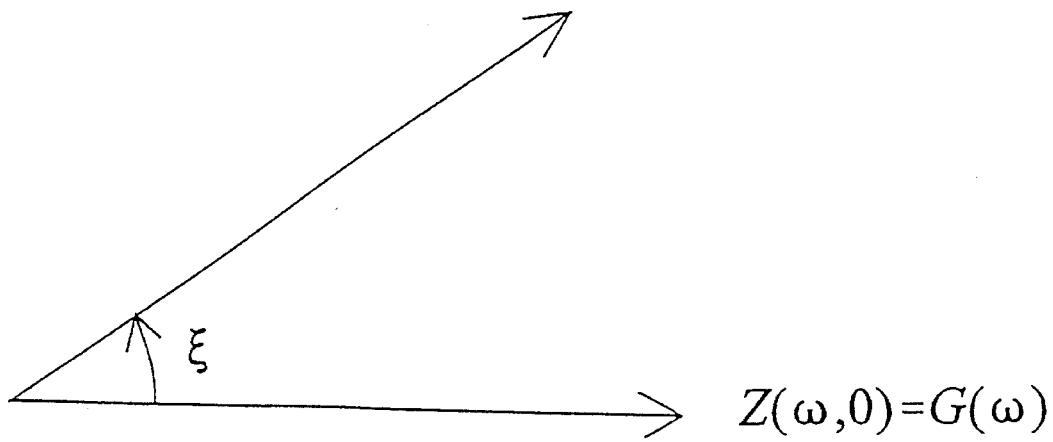
FIG. 5 is a diagram of acoustic wavefield axes for a transmitter transducer pair depicting their acoustic axes.

The above embodiment and experimental results illustrate the generation of a varying constant phase wavefield using a narrow bandwidth signal. A brief mathematical treatment further illuminates the way phase may vary: suppose a transducer is placed such that the Fourier transform of its wavefield along the zero degree axis is $Z(\omega,0)=G(\omega)$ (FIG. 5). Another transducer is placed such that its wavefield along the $\theta=\xi$ axis is $Z(\omega,\xi)=G(\omega)e^{j\kappa\xi}$, where $\kappa$ is a constant.

It is necessary to define the term directivity response, which describes the relative amplitude of the transducer signal versus angle, given some fixed radial distance. A directivity response is similar to a beam pattern, except that a beam pattern amplitude usually is expressed on a logarithmic scale of decibels (see Kinsler et al. in *Fundamentals of Acoustics*, 1982). Thus if a directivity response is spherical, so is the corresponding beam pattern. The directivity response also corresponds to what Kinsler et al. call the directional factor.

Let the amplitude directivity responses of the transducers take a partial sine wave form. Then a linear phase variation given by $\exp(j\kappa\theta)$ is achieved (in between the $\theta=0°$ and the $\theta=\xi$ axes).

Figure 6:
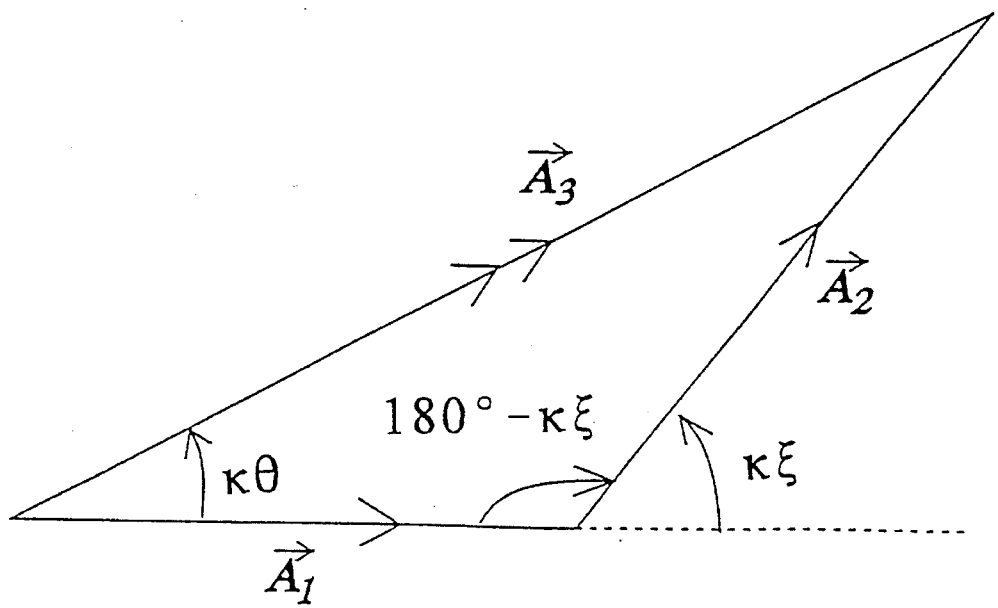
FIG. 6 is a vector diagram of vector addition of the wavefield of FIG. 5.

A vector diagram is most helpful in the understanding of the desired phase function directivity response. Let the Fourier transform of the transmitter signals be represented as vectors. Along the $\theta$-direction, the addition of $\vec{A}_1$ from transmitter $T_1$ and $\vec{A}_2$ from transmitter $T_2$, yields $\vec{A}_3$ as in FIG. 6. Mathematically, $$\vec{A}_1 = A_1(\theta)G(\omega), A_1(0)=1, \vec{A}_2=A_2(\theta)G(\omega)e^{j\kappa\xi}, A_2(\xi)=1. \quad (5)$$

where $A_1(\theta)$ and $A_2(\theta)$ are the directivity responses of transmitter $T_1$ and $T_2$ respectively. It is clear that $\vec{A}_2$ is at an angle $\kappa\xi$ counter-clockwise from $\vec{A}_1$, on the complex plane. As $\vec{A}_3$ is the resultant signal, it should make an angle $\kappa\theta$ with vector $\vec{A}_1$.

If the directivity responses are assumed to have the form $$A_1(\theta)=M\sin[\kappa(\xi-\theta)], A_2(\theta)=M\sin(\kappa\theta). \quad (6)$$

where M is a function to be determined, then the phase term of the resultant signal at the $\theta$-axis equals $\exp(j\kappa\theta)$ as required. This can be shown by applying the trigonometric sine rule to the vector diagram in FIG. 6. Furthermore, if one desires the resultant amplitude response to be constant such that $|\vec{A}_3|=1$, 1 then $$M^2 = \frac{1}{\sin^2[\kappa(\xi-\theta)] + \sin^2(\kappa\theta) + 2\sin(\kappa\theta)\sin[\kappa(\xi-\theta)]\cos(\kappa\xi)}, \quad (7)$$

and $A_1(\theta)$ and $A_2(\theta)$ are more complicated trigonometric functions.

Figure 7:
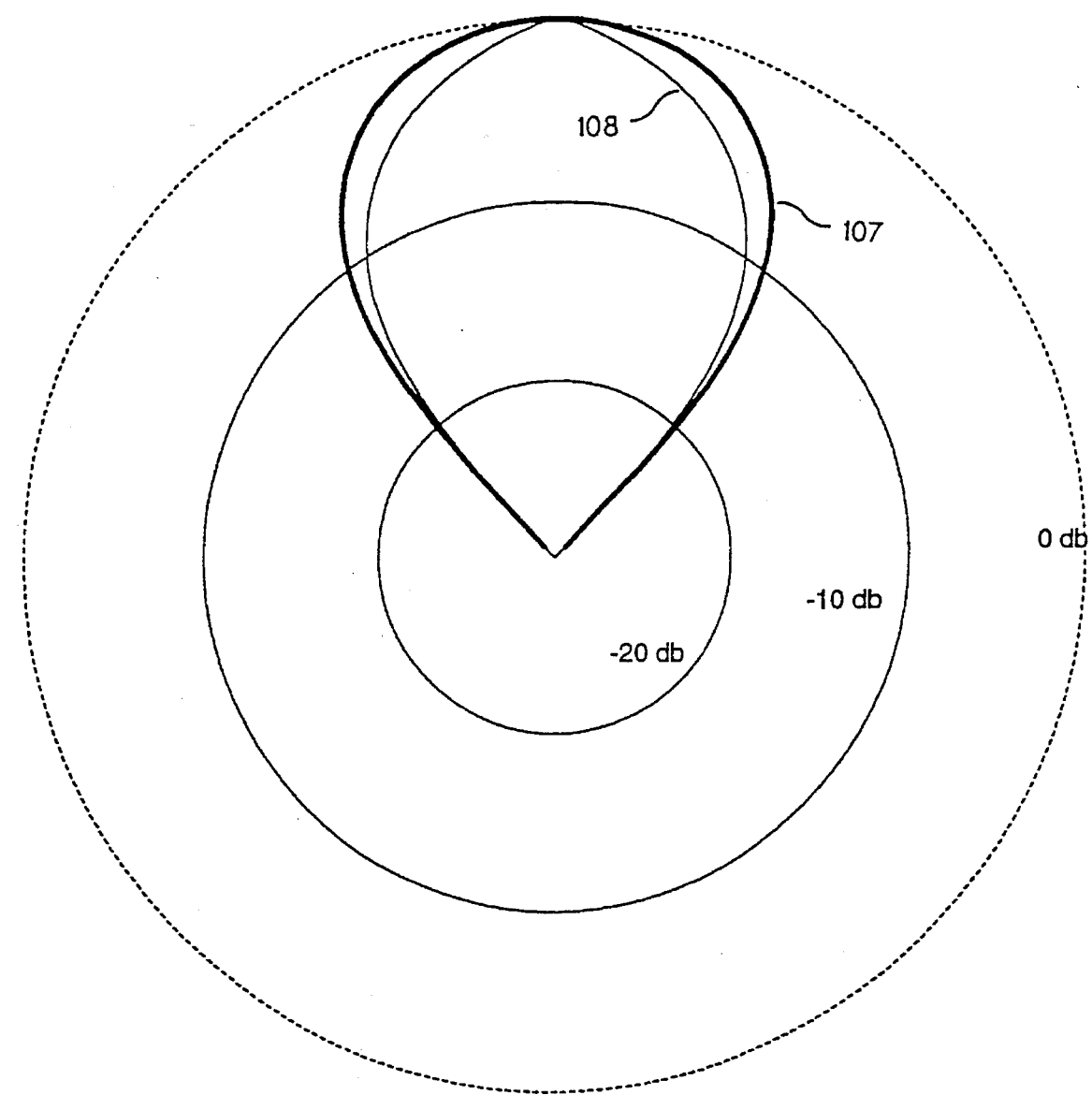
FIG. 7 is a diagram of ideal waveform beam pattern lobes for transducers according to the present invention.
Figure 8:
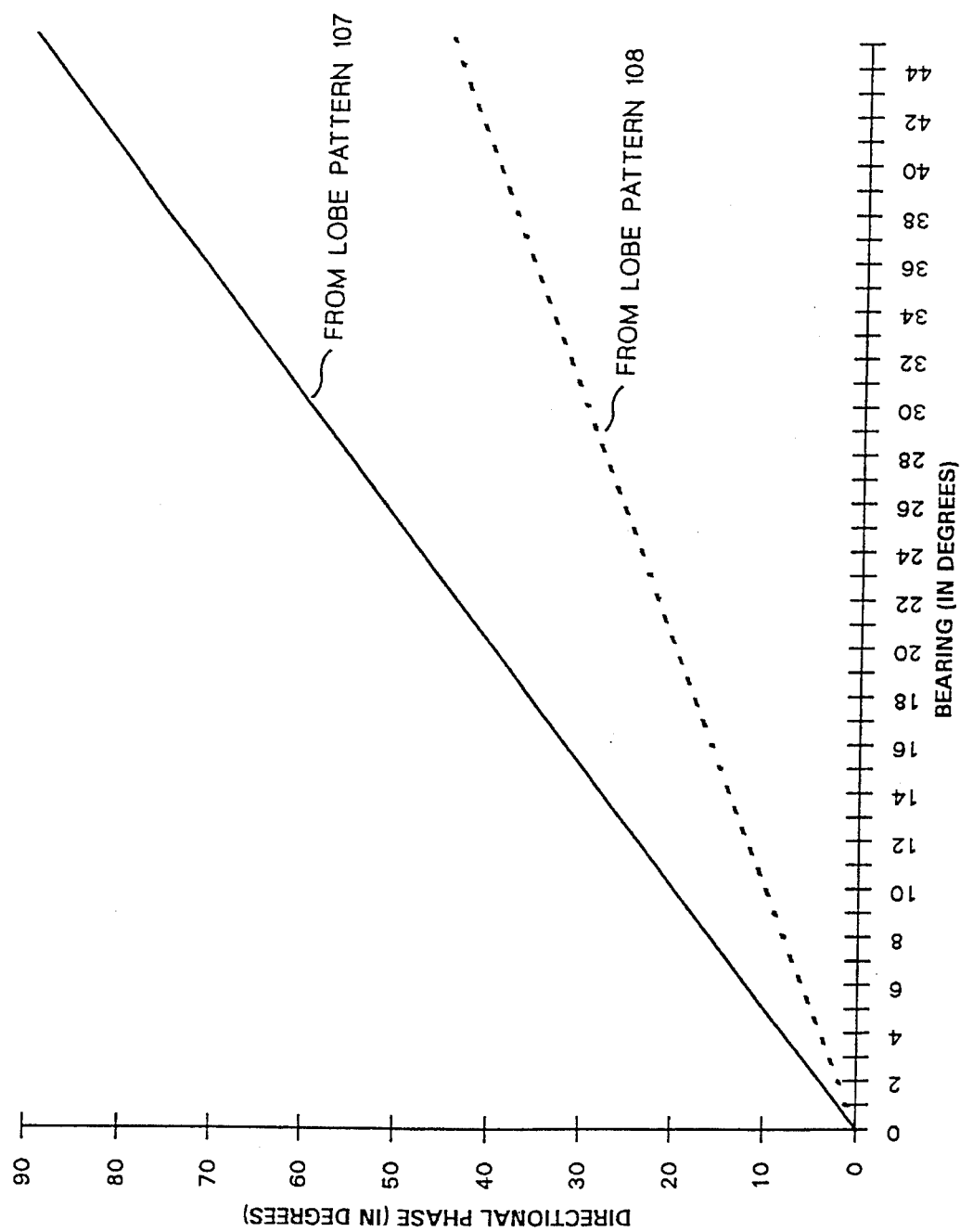
FIG. 8 is a plot of ideal directional phase as a function of bearing for a transducer according to the present invention for two sets of parameters.

For a nearly monochromatic signal, FIG. 7 shows the required beam patterns as the result of theoretical calculation for two cases: beam lobe pattern 107 for $\xi=45°$, $\kappa=2$ and beam lobe pattern 108 for $\xi=45°$, $\kappa=1$ respectively, which are the same for both transducers $T_1$ and $T_2$. FIG. 8 shows that the desired phase variation of the combined signals is achieved. The directivity response of the combined signals can also be shown to be constant in between the two acoustic axes.

In practice, as long as the directional phase variation is uniquely distinguishable (including non-linear variation), target direction identification continues to be feasible. It can be shown that as long as the directivity (amplitude) response of the two transmitters $T_1$ and $T_2$ decreases monotonically in moving away from their acoustic axis, the directional phase changes monotonically between them as well. This is illustrated by the vector diagrams of FIG. 9. Note also that the indicated phase character would be imparted by the transducer equally well to a detected wavefield.

Figure 9:
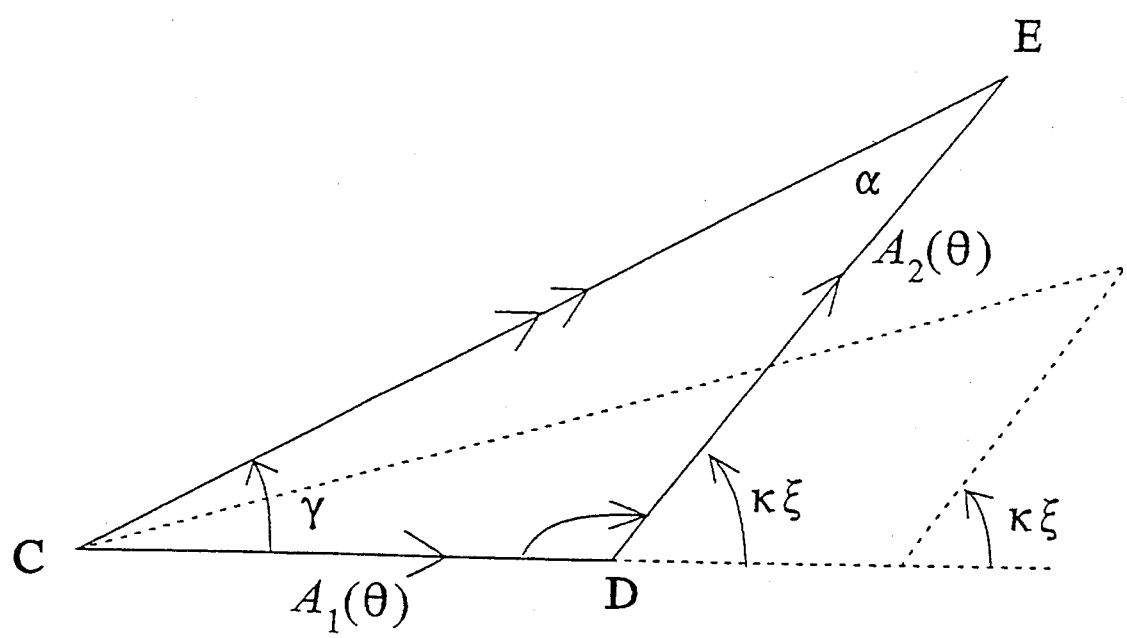
FIG. 9 is a vector diagram of the effect of directivity responses of a transmitter transducer pair on a resultant transducer wavefield according to the present invention.

In FIG. 9, the vector $CD=A_1(\theta)$, the vector $DE=A_2(\theta)$, and $\alpha=\kappa\xi-\gamma$. It can be seen graphically that if either CD increases or DE decreases or both, the directional phase angle $\gamma$ decreases. Such a situation occurs when one moves away from the transmitter $T_2$ acoustic axis towards the transmitter $T_1$ acoustic axis. Mathematically, the same conclusion can be proved if it can be shown that $\partial\gamma/\partial A_1<0$ and $\partial\gamma/\partial A_2>0$. At an intermediate angle where the directivity responses have equal amplitudes, the directional phase angle is the average of the directional phase angles of both transmitters. Of course in more sophisticated transducer designs, the average can be a weighted sum of any number of elements.

In FIG. 10(a) showing prototype phase-encoding/direction transmitting testing a transducer 110 having two piezoelectric or piezo film transducer elements 112 is shown mounted on top of a rotatable pole 114. The bottom of pole 114 is connected to a motor which can rotate the pole in suitable increments, such as one-hundredth of a revolution, or 3.6°. A receiver transducer 116 has a single piezo film transducer element 118 at a separate location spaced from transducer 112, also on a pole 120 as indicated in FIG. 10(a). In the test, the pole 120 was spaced from the pole 114 a distance X of 20.3 cm, for reasons set forth below.

For the present invention, a wide-band Neidlian signal is used, because a phase change is indistinguishable from a time shift for a truly monochromatic (sinusoidal) signal. For a broad-band signal such as the cosine modulated sinc function, however, a constant phase shift over the bandwidth does not result in a time shift; instead it results in a change of the wavelet shape. Selection of frequency range is based on two main factors: the upper bound in frequency is governed by the experimental mechanical positioning inaccuracies; and the lower bound is determined in relation to the size of the Fresnel zone.

For illustrative purposes it is easier to build a transmitter to function in air rather than in water, and therefore a signal velocity in air of 343 m/s is used. Henceforth, a frequency range of v=15 kHz to 45 kHz, having corresponding wavelengths of λ=2.3 cm to 0.76 cm in air is used. The radii of first Fresnel zones at the source-receiver travel distance of $h_0$=20.3 cm according to the Sheriff and Geldart definition in *Exploration Seismology*, Vol. 1, p. 121, 1982 are $$R_F = \left( \frac{1}{2} \lambda h_0 \right)^{1/2} = \begin{cases} 4.8 \text{ cm}, & v = 15000, \\ 2.8 \text{ cm}, & v = 45000. \end{cases} \tag{8}$$

The transducer size also should not be too much smaller than the wavelength in order to radiate effectively and capture sufficient energy.

In selecting transducer materials, it has been found that many off-the-shelf transducers are usually tuned to one frequency, and to function over a wide-band, several such transducers together with receiver or transmitter electronics are needed. Recently, a type of piezo film manufactured by ATOCHEM based on the highly polar poly-vinylidene fluoride material has been developed. It has been found suitable for detecting a wide-band signal. This type of piezo film also provides sufficient ultrasonic energy, as transmitters, for explanatory experimental purposes.

Figure 10B:
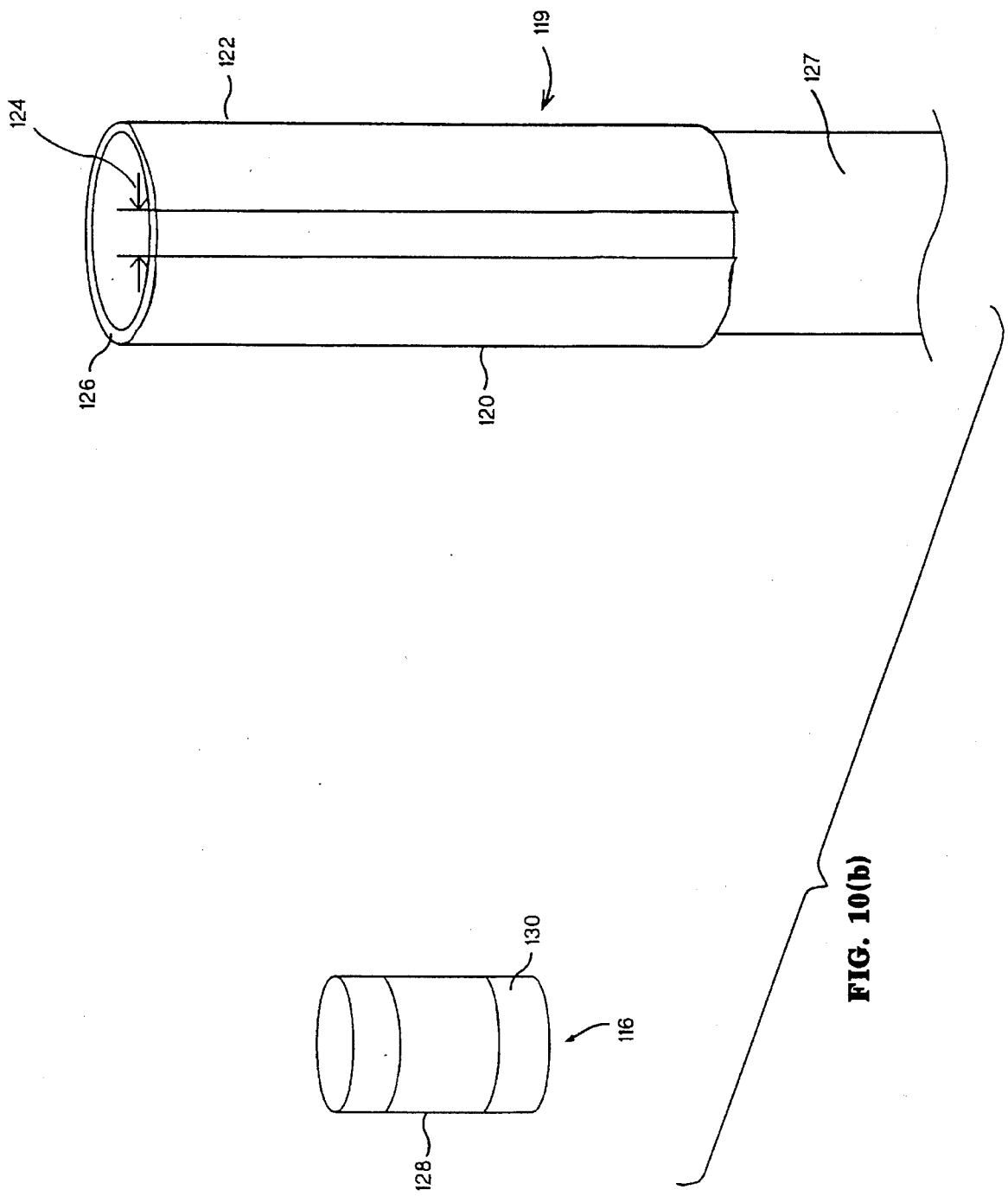
FIGS. 10(a) and (b) are isometric views of a transmitter and receiver transducers used to record wavefields.

The prototype transducer 119 shown in FIG. 10(b) functions as a transducer T according to the present invention. Transducer 119 therefore is composed of two partially cylindrical piezo films 120 and 122 disposed as shown, functioning as the transmitter transducer pair $T_1$ and $T_2$. Transducer films 120 and 122 are spaced from each other an arc distance 124 on a cylindrical sheet 126 of gasket material of about 1.5 mm thickness mounted on a rotatable pole 127. A single cylindrical piezo film 128 on a body 130 serves as the receiver transducer 116 (FIG. 10(b)). The piezo film transmitters 120 and 122 are individually driven by separate waveform generators 50 and 56, each generator being capable of synthesizing a suitable Neidlian wavelet.

In the embodiment of FIG. 10(b), the piezo films 120 and 122 each measure 1.6 cm in arcuate extent, 7.0 cm high and 52 μm (micrometers) in thickness. The cylindrical sheet 126 is about 2.2 cm in diameter and the distance 124 is 0.6 cm. The piezo film 128 is 1.2 cm in height and 3.0 cm in circumference, mounted on body 130 which is 1.2 cm in diameter. In FIG. 10(a), each of the two piezo films 112 of transducer 110 is like that of the films 120 and 122 of FIG. 10(b). The receiver transducer 116 is like that of FIG. 10(b).

Figure 11:
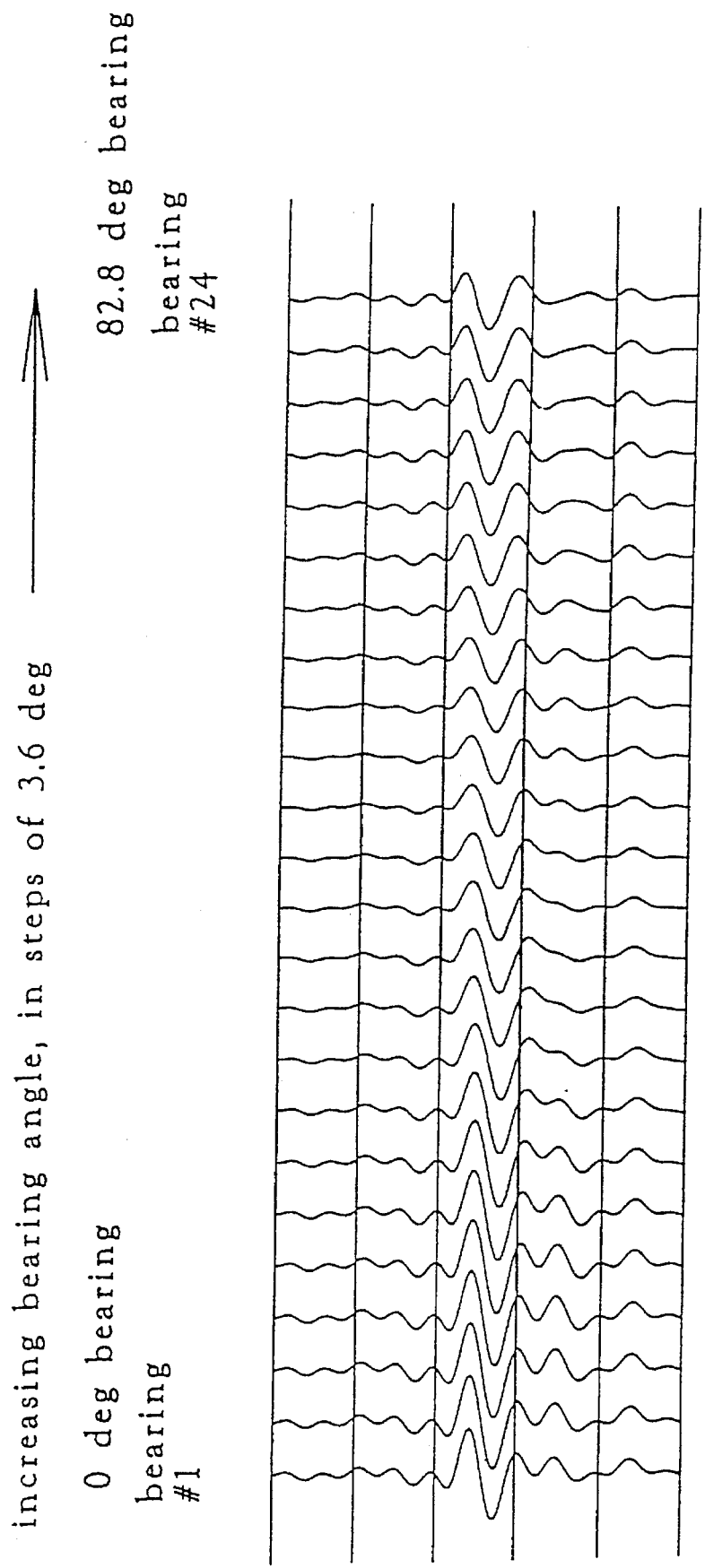
FIG. 11 is a waveform diagram of received signals as a function of bearing angle from a transducer according to the present invention.
Figure 12:
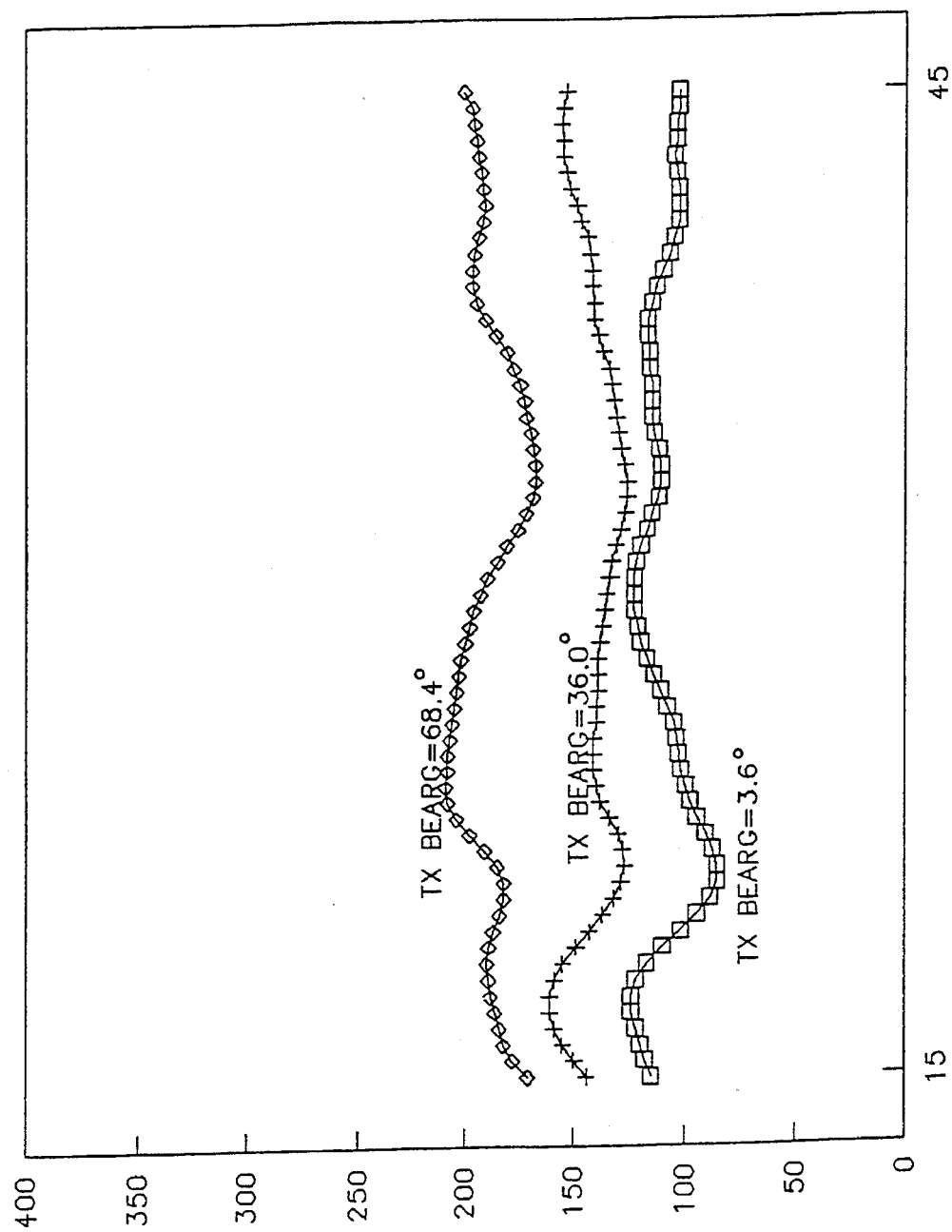
FIG. 12 is a plot of estimated phase values over a frequency bandwidth for different transducer bearing angles.

FIG. 11 shows the wavelets generated by the transducer 110 of FIG. 10(a) and recorded over a range of bearing angles or directions. The gradual change from essentially an anti-symmetric wavelet at #1 position to a more-or-less symmetric wavelet can clearly be seen. FIG. 12 shows plots of estimated constant phase values over the bandwidth at three different bearing angles. The mean directional phase over the full range of frequencies 15–45 kHz versus bearing angle is plotted in small square symbols 132 in FIG. 13. Both FIG. 12 and 13 derive from experimental data. For each transducer, the mean amplitude at a constant radial distance over the 15–45 kHz band width is found to decrease montonically from its acoustic axis within the angular window of interest, as desired by theory.

Figure 13:
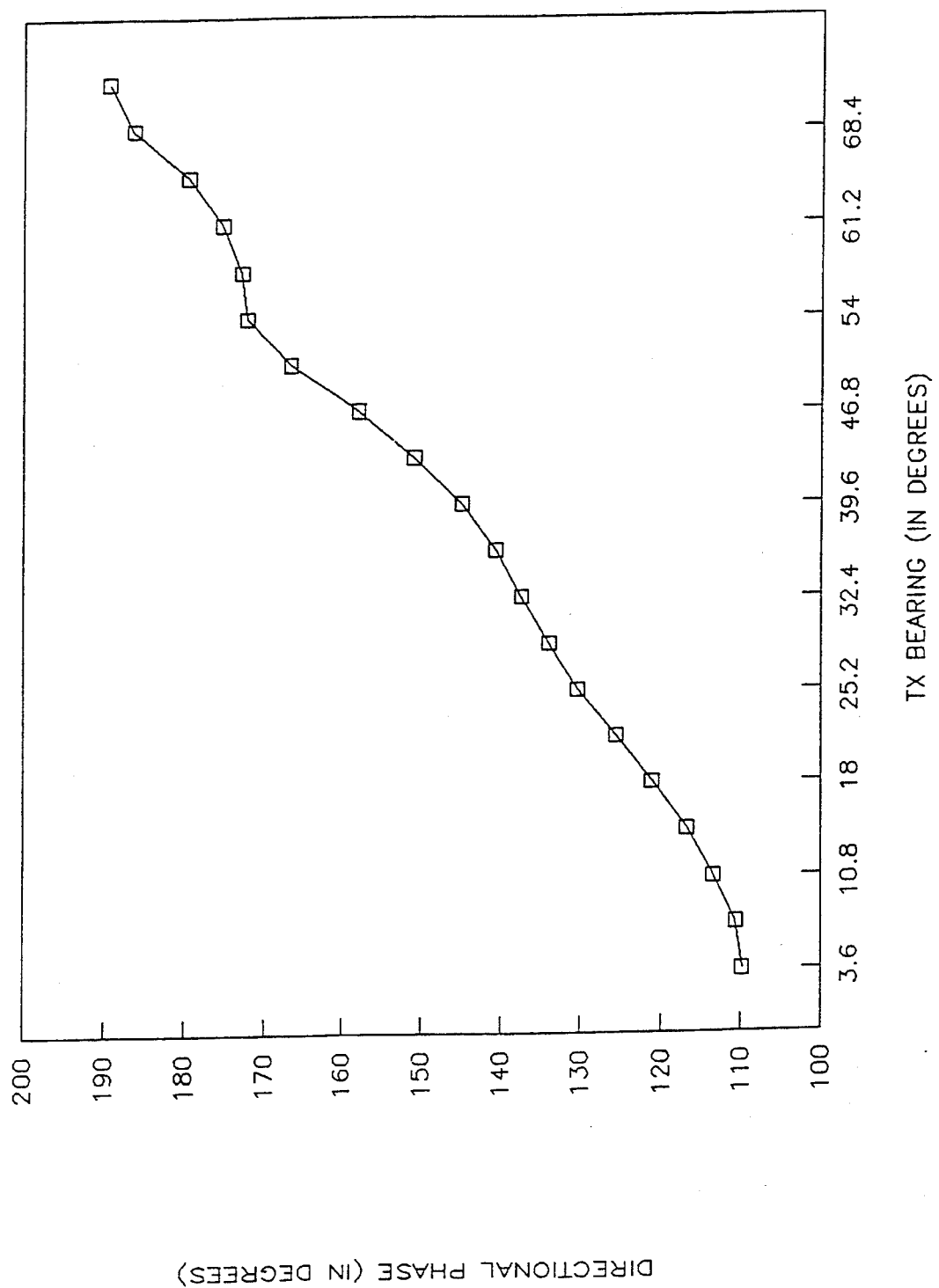
FIG. 13 is a plot of mean directional phases of the wavefield plotted in FIG. 12.

From FIG. 13 it can be noted that the mean phase increases monotonically with direction or bearing angle, although the variation is not linear. If more piezo films were used, a more nearly ideal Neidlian behavior would be achievable. However, as mentioned, the results shown in FIG. 13 remain useful in target bearing identification or navigational application. Further experimental data are set forth below. FIG. 13 also shows that the Neidlian wavefield can be generated by only two transducers, which is a significant feature of the present invention. It should be understood, however, that for more sophisticated transducer designs, larger numbers of transmitter transducer elements can be used.

Figure 14A:
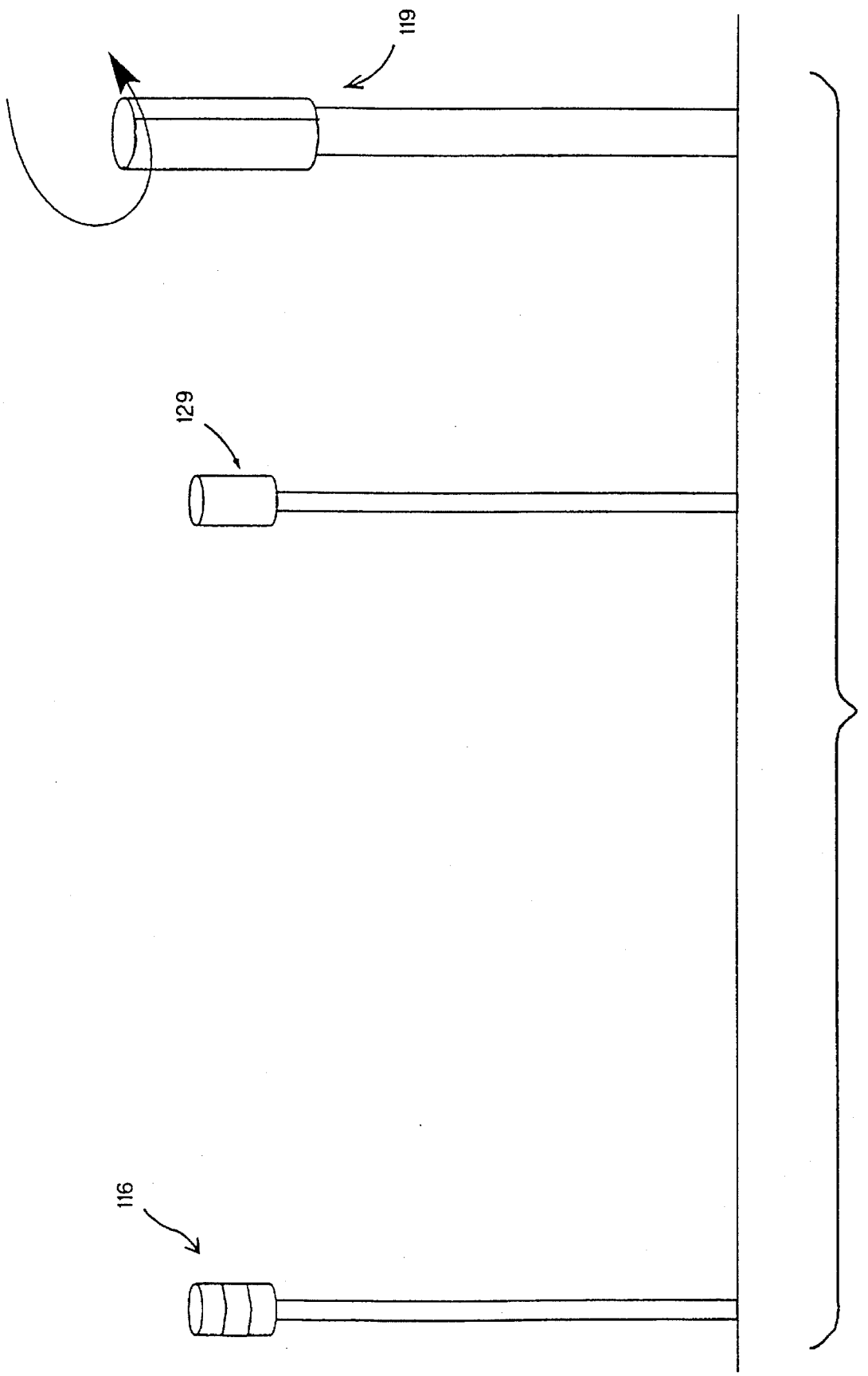

FIG. 14(a) shows a simulated obstruction 129 interposed between rotatable transmitter transducer 119 and receiver transducer 116 along a common axis in the same, aligned vertical plane. Consider next the reflected echoes obtained from a plane reflector 134 (FIG. 14(b)) in the form of a 7.6 cm×19.0 cm aluminum plate. The receiver transducer 116 is placed at a sufficient distance (10.2 cm) away from the rotatable transmitter 110 to avoid the interference of the reflected wavefield from the transmitter mounting. The vertical axes of the receiver 116 and the transmitter 110, and the aluminum plate 134 are aligned to be parallel.

Figure 15A:
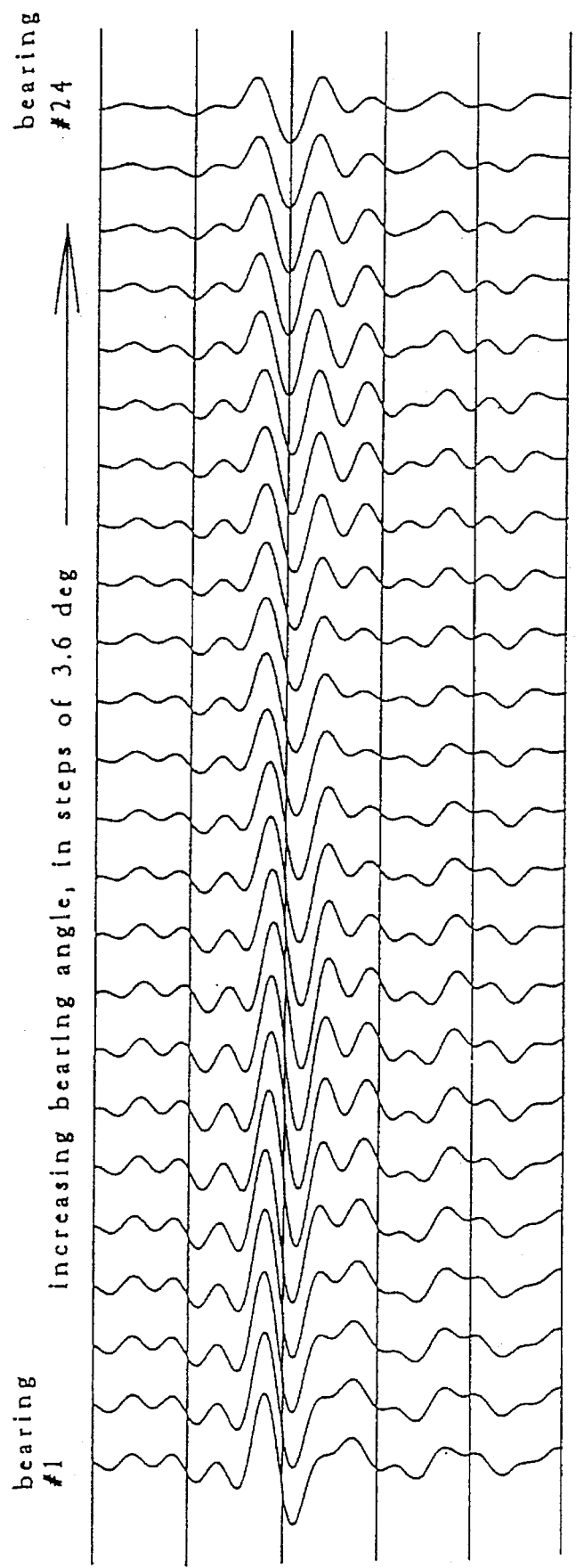
FIG. 15(a) is a plot of reflected echoes from a plane reflector of FIG. 14(b).
Figure 15B:
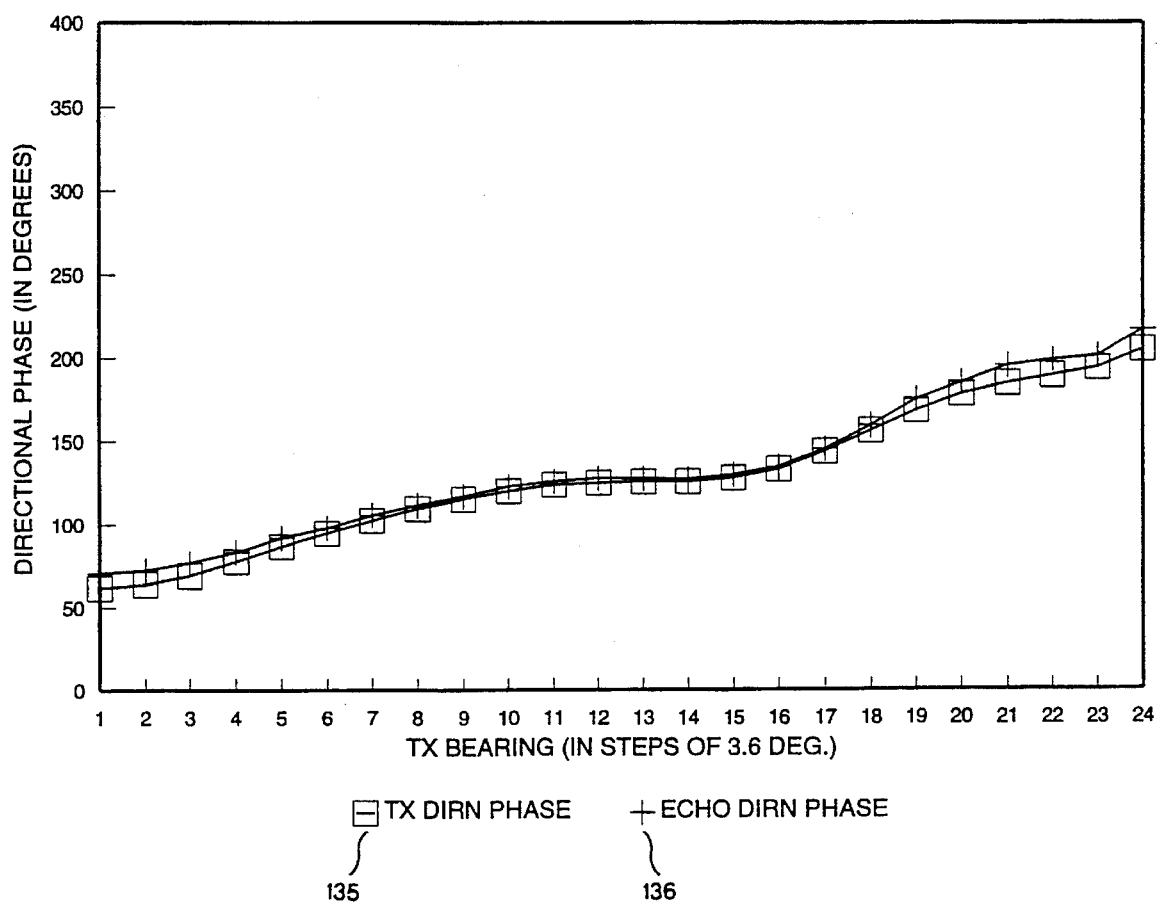
FIGS. 15(b) and 15(c) are plots of mean phases measured from the test equipment of FIGS. 14(a) and 14(b).

FIG. 15(b) shows the directional mean phases for two measured cases: square (□) symbols 135 represent data deriving from the transmitted Neidlian wavefield recorded as in FIG. 14(a), which includes a simulated obstruction. Plus (+) symbols 136 pertain to the echo wavefield recorded in the test configuration of FIG. 14(b). The two mean phases agree with one another quite well. The simulated obstruction of FIG. 14(a) was to provide compensation for effects of the receiver obstructing some part of the wavefield in FIG. 14(b) but these effects were observed to be quite unimportant. Note that the size of the aluminum plate 134 is comparable to the calculated Fresnel zone. The horizontal dimension (19.0 cm) is about two times the largest Fresnel zone (9.7 cm diameter) and the vertical dimension (7.6 cm) is not too much smaller. Data from a still larger plate showed similar results. FIG. 15(a) shows the plate echo waveforms as the transmitter rotates producing mean phases 136 as shown in FIG. 15(b). Waveforms change from having anti-symmetric form to symmetric form as the directional angle or bearing increases in a manner similar to what can be seen in FIG. 11 for direct transmission.

Results shown in FIG. 15(b) demonstrate that directional phase of an echo seen by a receiver not coincident with the transmitter axis is the same as the transmitted directional phase along the shortest path or along the path perpendicular to the plane reflector 134. These results also confirm that the Method of Images is applicable to the Neidlian wavefield with regard to the directional phase.

In the Method of Images, the reflection of an incident field originating from a distance h above an infinitely large plane reflector is mathematically equivalent to the continuation of the wavefield from a source image situated at an equal distance h below the reflector. For a Neidlian pressure wavefield and for the reflection off a rigid boundary in a fluid medium, it can easily be shown that the Method of Images satisfies the necessary boundary conditions.

It is useful now to consider a case where the reflected wavefield from the transmitter of the present invention suffers a phase distortion other than one relating to directional information. Recall that this can result from factors like a property of the propagation medium or else from echoes deriving from small reflecting bodies. When a plane reflector L is small compared to the Fresnel zone or when the ray path between the source S and the receiver D is situated near to the edge of the plane reflector L, diffraction effects due to the edges can become pronounced.

These diffraction effects were studied by Trorey for a spherical point source (*Geophysics*, Vol. 35, pp. 762–784, 1970 and Vol. 42, pp. 1177–1182, 1977). Trorey's method can be modified to derive a corresponding formula for the Neidlian wavefield whose monochromatic form may be represented as $$\phi_s(r_s,\theta_s,\phi_s,t) = e^{j\omega t}\frac{e^{-jkr_s}}{r_s} e^{j\gamma(\theta_s,\phi_s)}, \quad (9)$$

where $r_s,\theta_s,\phi_s$ are the spherical co-ordinates relative to the source image point S (FIG. 16) and $\gamma(\theta_s,\phi_s)$ is the directional phase. $\phi_s$ is an angular co-ordinate in the plane of the reflector. t denotes the time, $\omega$ is the angular frequency, and $k/(2\pi)$ is the wave number. Relating equation (9) to equation (2), C is counterpart to the radial term $e^{-jkr_s}/r_s$.

Figure 16:
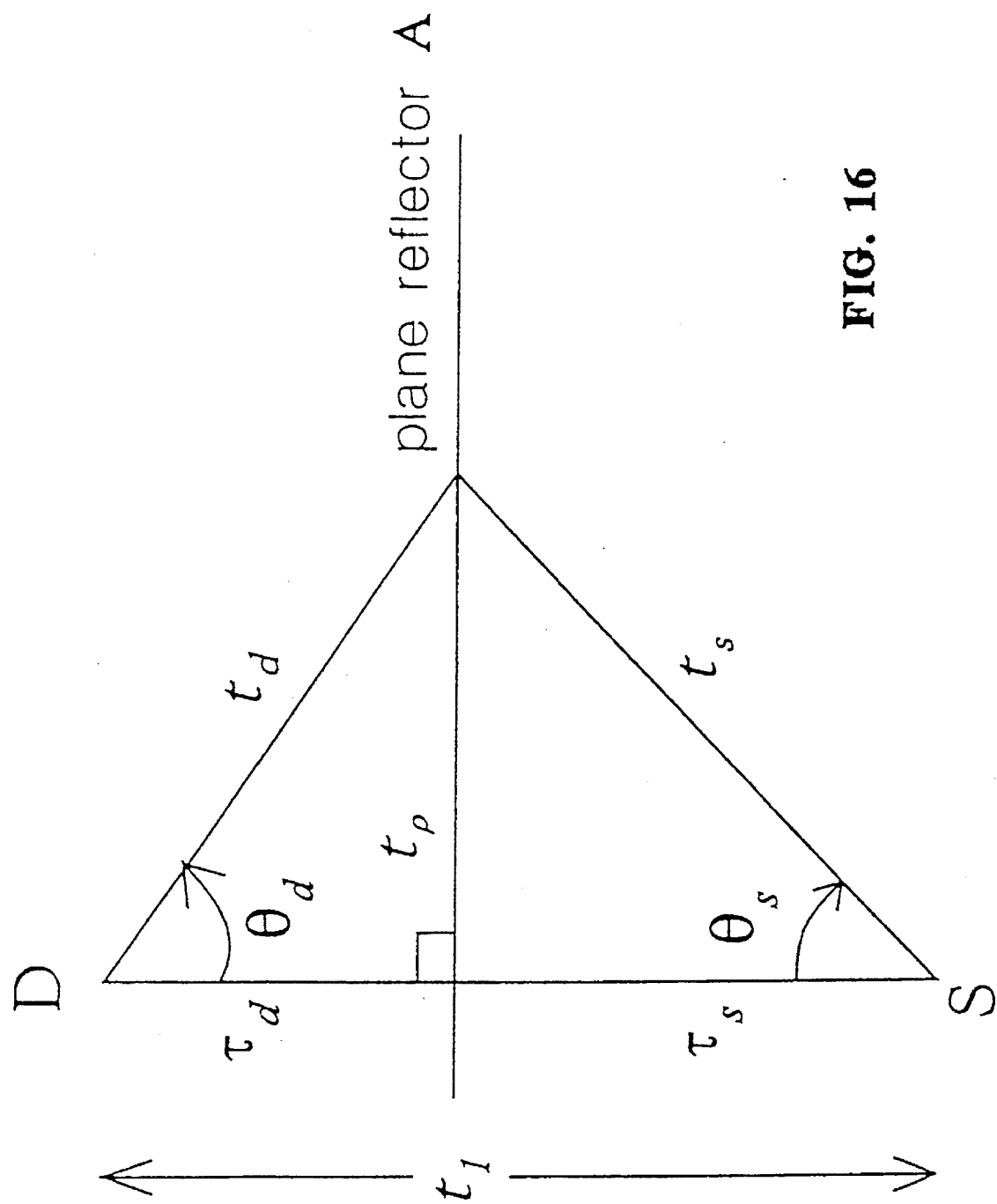
FIG. 16 is a diagram of time variables explaining a diffraction response formula.

For a corresponding Neidlian wavefield with infinite bandwidth, the Laplace transform of the diffraction response can be shown to be $$\Psi_0(p) = \frac{1}{ct_1} e^{-pt_1} e^{j\gamma_1} - \frac{1}{4\pi} \oint e^{-pt_2} e^{j\gamma(\theta_{s2},\phi_s)} b(t_2)\, d\phi_s, \quad (10)$$

where c is the velocity and the time $t_1$ is as shown in FIG. 16, p is the Laplace transform parameter, and $\gamma_1$ is the directional phase of the transmitted wavefield in the direction perpendicular to the plane reflector.

The path of integration in the second term on the right hand side of equation (10) is taken along the edge of the reflector L. $t_2$ is the two-way travel time from the source image S to the edge of the plane reflector and from this edge to the detector D. $\theta_{s2}$ is the $\theta_s$-co-ordinate subtended by the edge at S. b is given by $$b(t) = \frac{1}{ct}\left\{\frac{\tau_s}{t_s} + \frac{\tau_d}{t_d}\right\}, \quad t = t_s + t_d, \quad (11)$$

where the time variables $\tau_s,\tau_d,t_s,t_d$ are defined in FIG. 16. Equation (10) is applicable if the separation of the detector D from the source S lies along a line perpendicular to the reflector L which joins them, as analogous to the receiver-transmitter configuration of FIG. 14(b).

The time-domain transformation of the first term on the right hand side of equation (10) is $$\frac{1}{ct_1} e^{j\gamma_1}\delta(t-t_1). \quad (12)$$

As $t_2 \to \infty$, the second term in equation (10) becomes zero. Therefore equation (12) is the time domain reflection response of an infinitely large plane reflector from a Neidlian wavefield with infinite uniform bandwidth.

Compared with Trorey's expression, the reflection response of Equation (12) is multiplied by $e^{j\gamma_1}$, which is the angular term in the direction perpendicular to the plane reflector. The integrand in the new diffraction response which is the second term on the right hand side of equation (10) is multiplied by an angular factor of $e^{j\gamma(\theta_{s2},\phi_s)}$, which is the value of the angular term at the point of integration $\phi_s$ on the edge of the plane reflector. These are recognized accordingly as simple extensions of Trorey's result.

As described earlier, the shape of the reflected echo from a large plane reflector is found by experiments to approximate that of the incident Neidlian wavefield in the direction along the shortest ray path from the source to the reflector where the receiver is offset only in terms of perpendicular distance from the source. However, it might be questioned whether similar results would hold for objects having smaller sizes as referred to the Fresnel Zone so long as they also have a flat reflecting surface. Plots obtained and shown in FIG. 17(a) through (d) reveal immediately that the echoes from small flat reflecting surfaces differ markedly from the impinging wavefield in form. The plots shown in FIG. 17 were obtained with the experimental set-up shown in FIGS. 14(a) and 14(b) except that the large rectangular reflector was replaced in turn with the appropriate small reflectors.

Figure 17A:
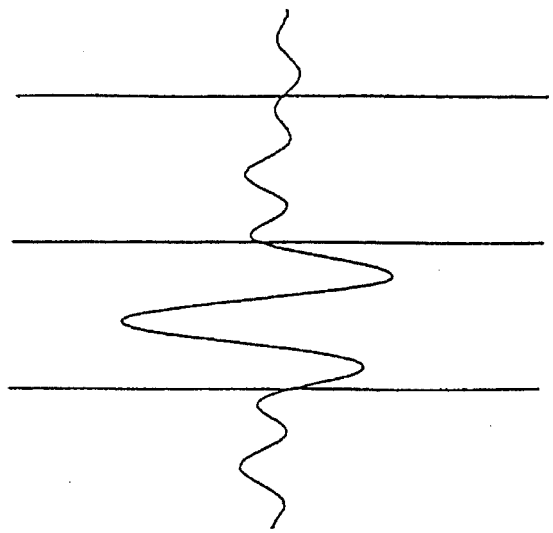
FIGS. 17(a), 17(b), 17(c), and 17(d) are waveform diagrams of the effects of diffraction on wavelet shape.
Figure 17B:
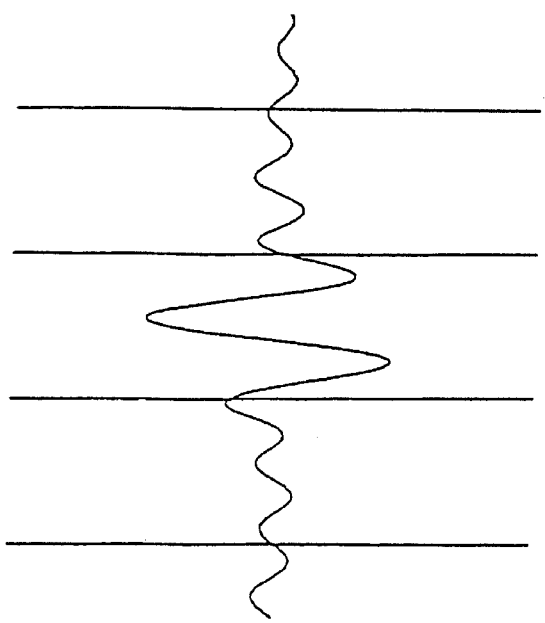
Figure 17C:
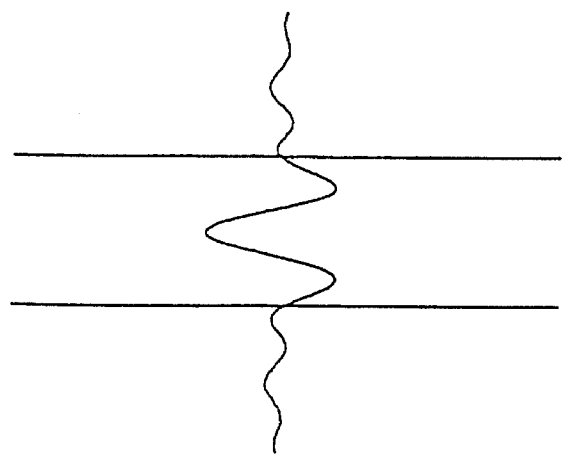
Figure 17D:
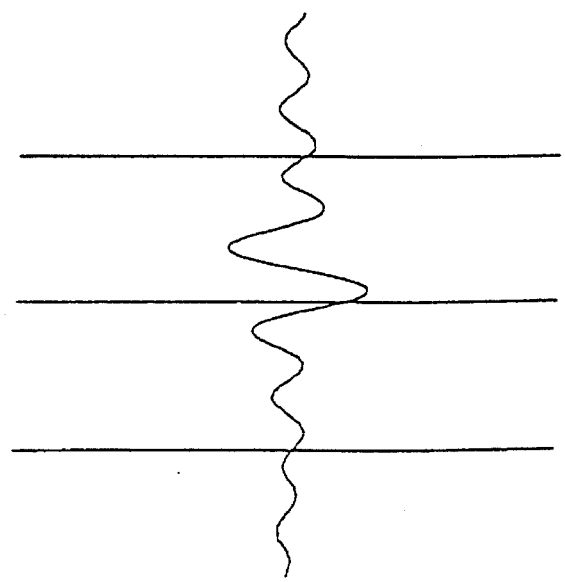

In FIGS. 17(a) and 17(c), two waveforms recorded directly from the experimental arrangement discussed above are shown. FIG. 17(b) is the waveform recorded for an echo of the wavelet of FIG. 17(a) from a small circular disc (approximately 3.3 cm in diameter). FIG. 17(d) is the waveform recorded of an echo of the wavelet of FIG. 17(c) from a small rectangular plate (1.8×3.6 cm in size).

In both cases shown, the dimensions of the objects are small enough such that the directional phase variation across the surface is negligible. The object dimensions are also small compared to dimensions of a Fresnel zone corresponding to the wavefield signal central frequency. Also for both cases, analysis shows that the distortion of the incident waveform after reflection can be described by a constant phase shift (independent of frequency) of about 70° to 80°.

Figure 18A:
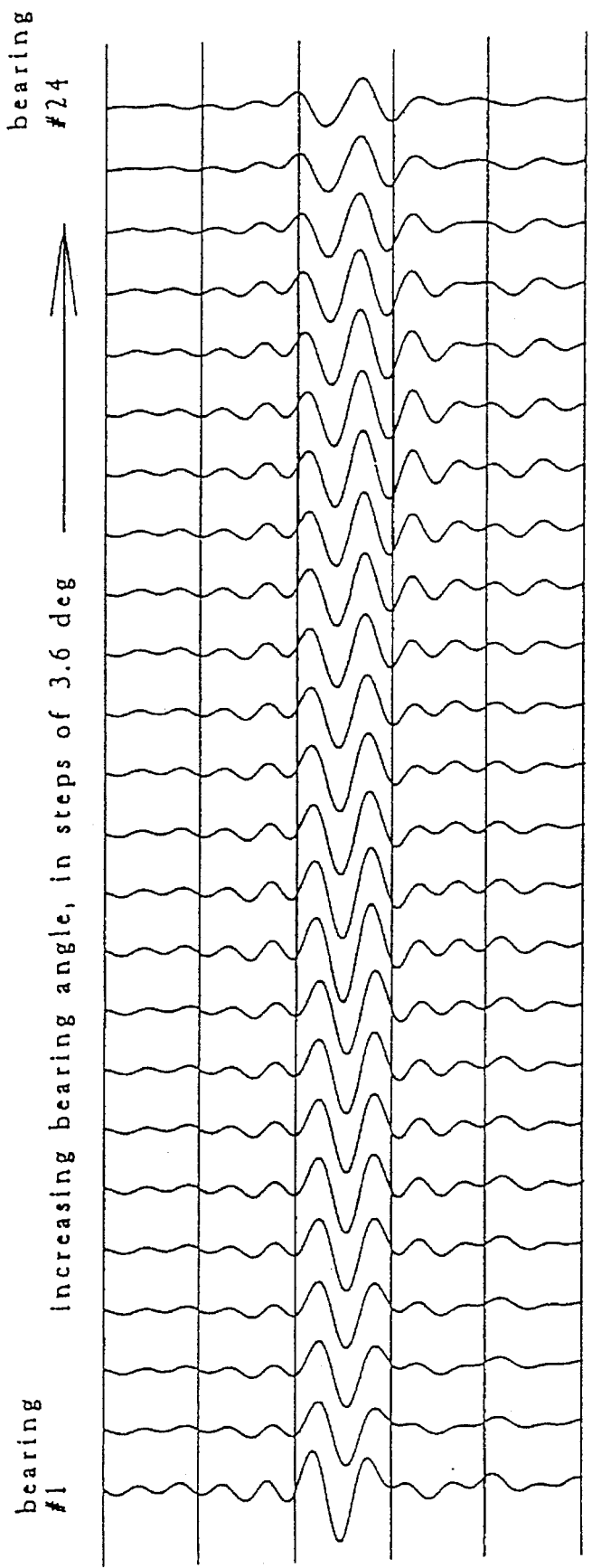
FIGS. 18(a), 18(b), and 18(c) are plots of reflected echo and the mean directional phases.
Figure 18B:
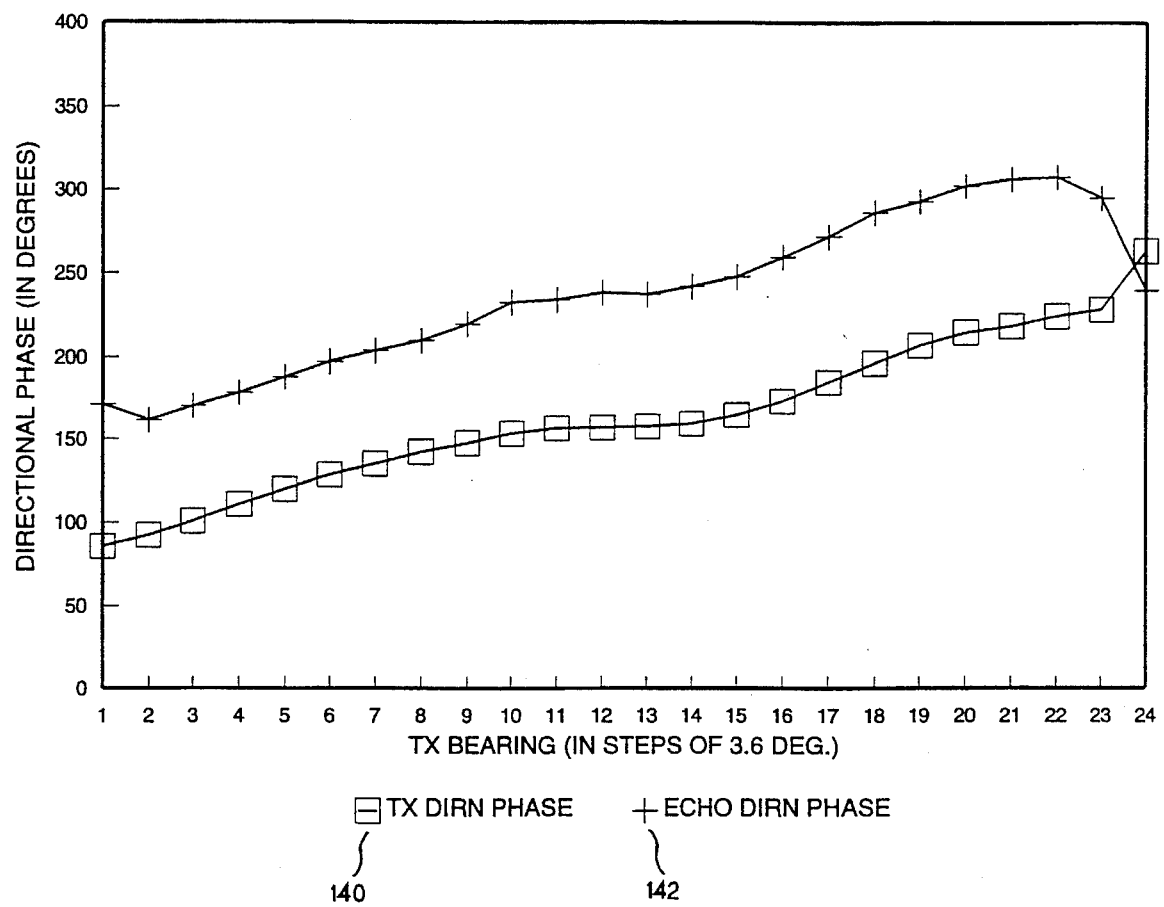
Figure 18C:
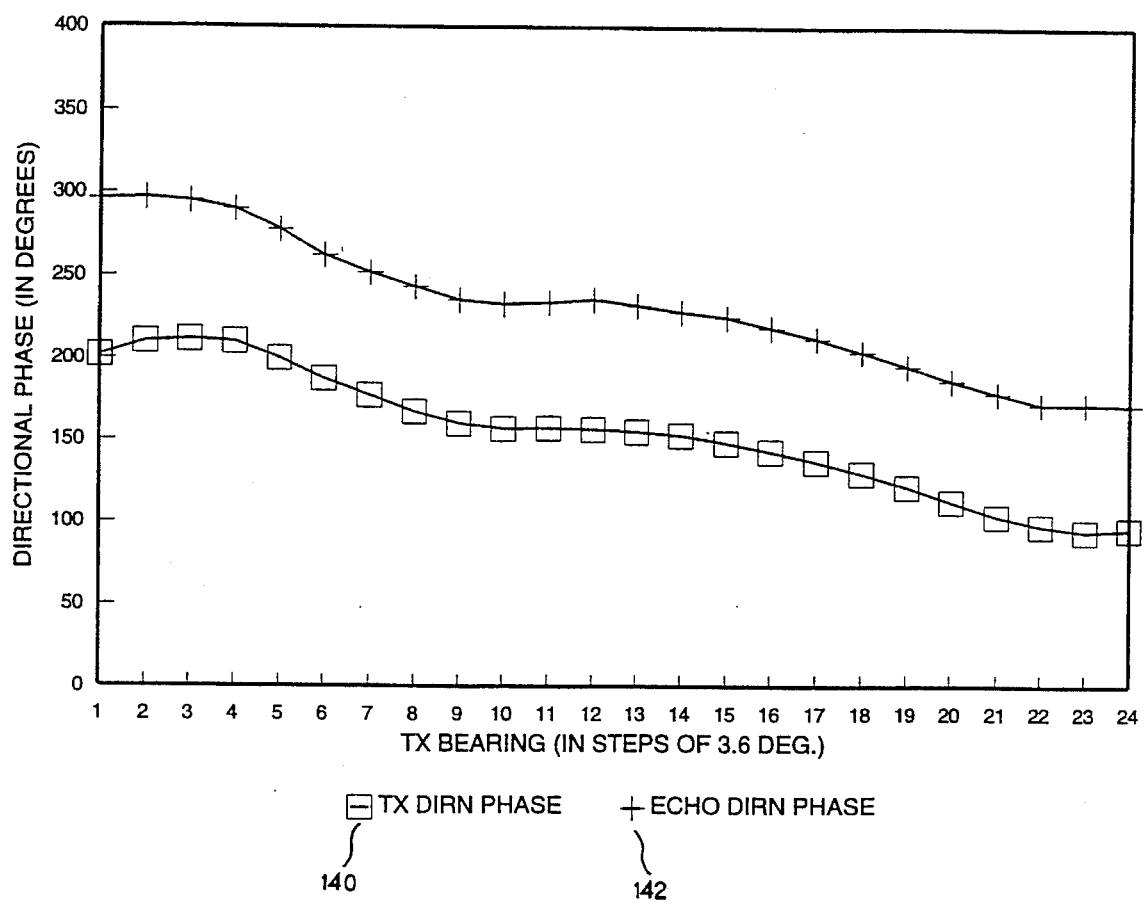
Figure 19A:
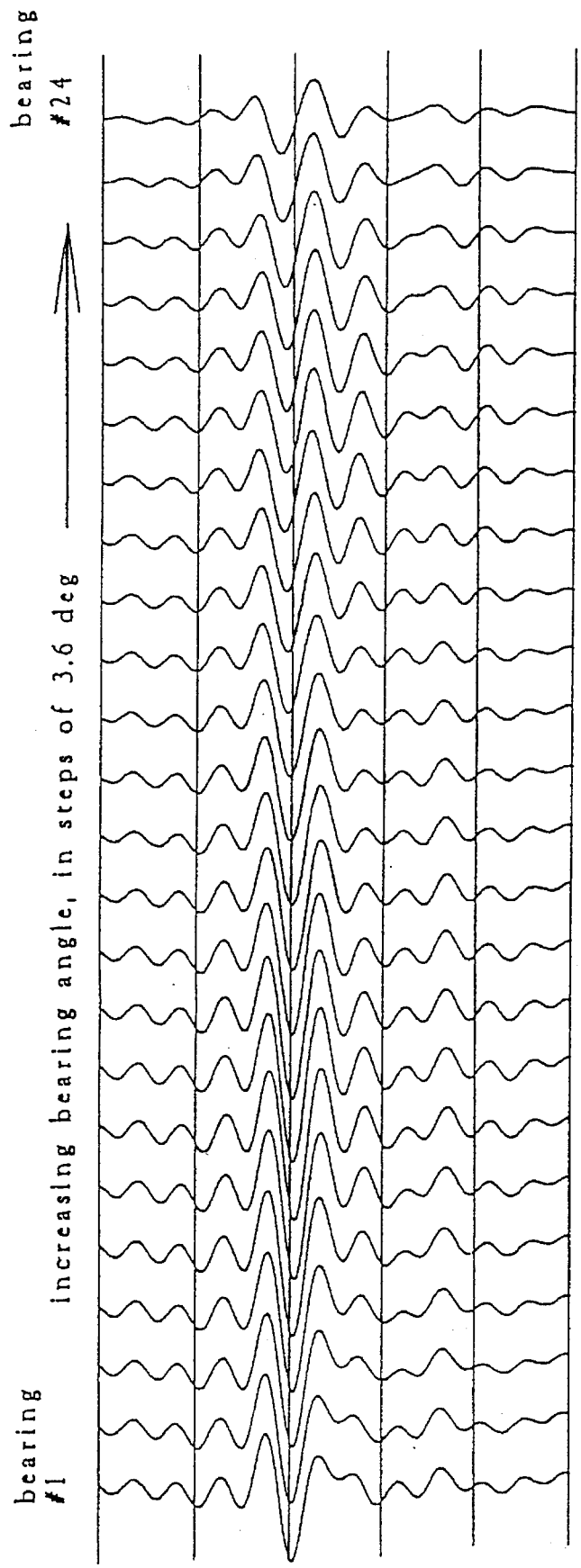
FIGS. 19(a), 19(b), and 19(c) are plots of reflected echo and the mean directional phases.
Figure 19B:
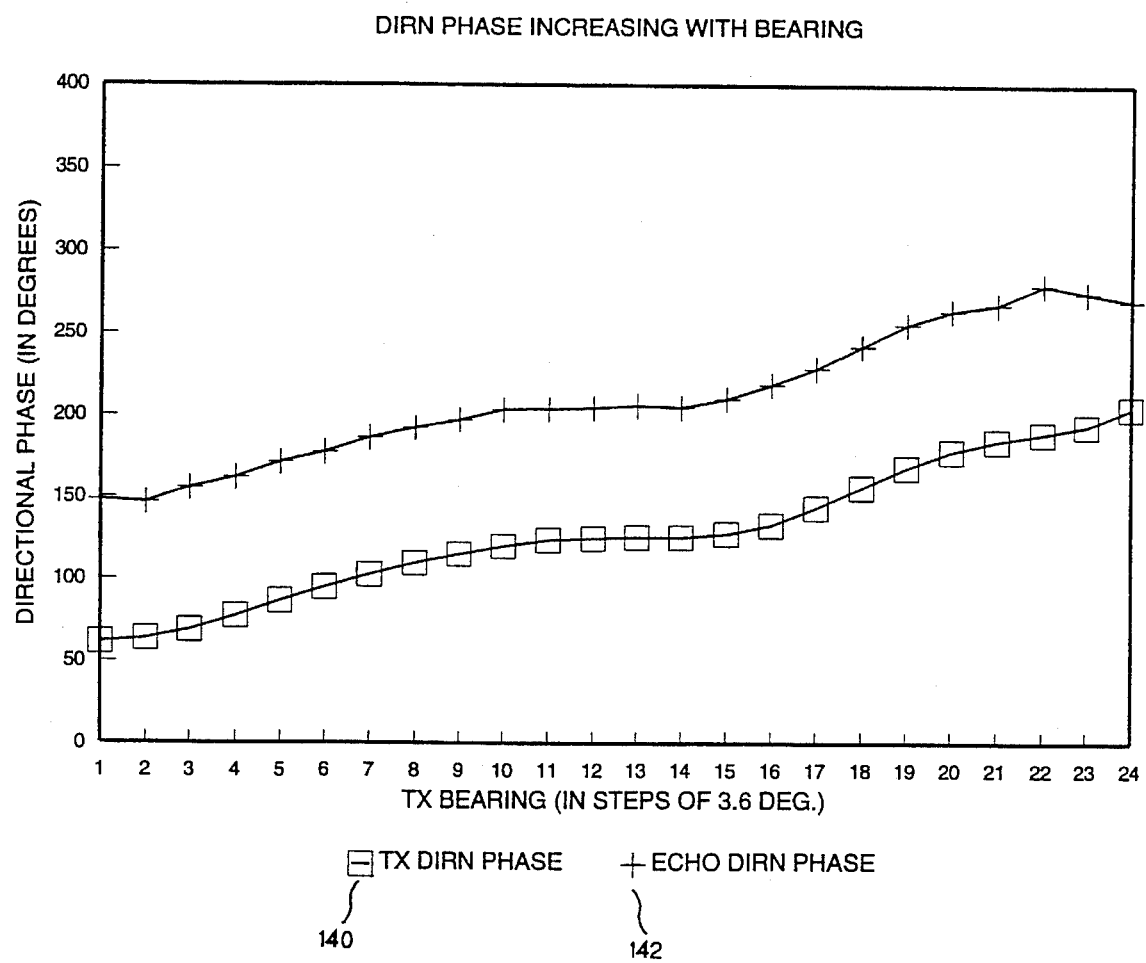
Figure 19C:
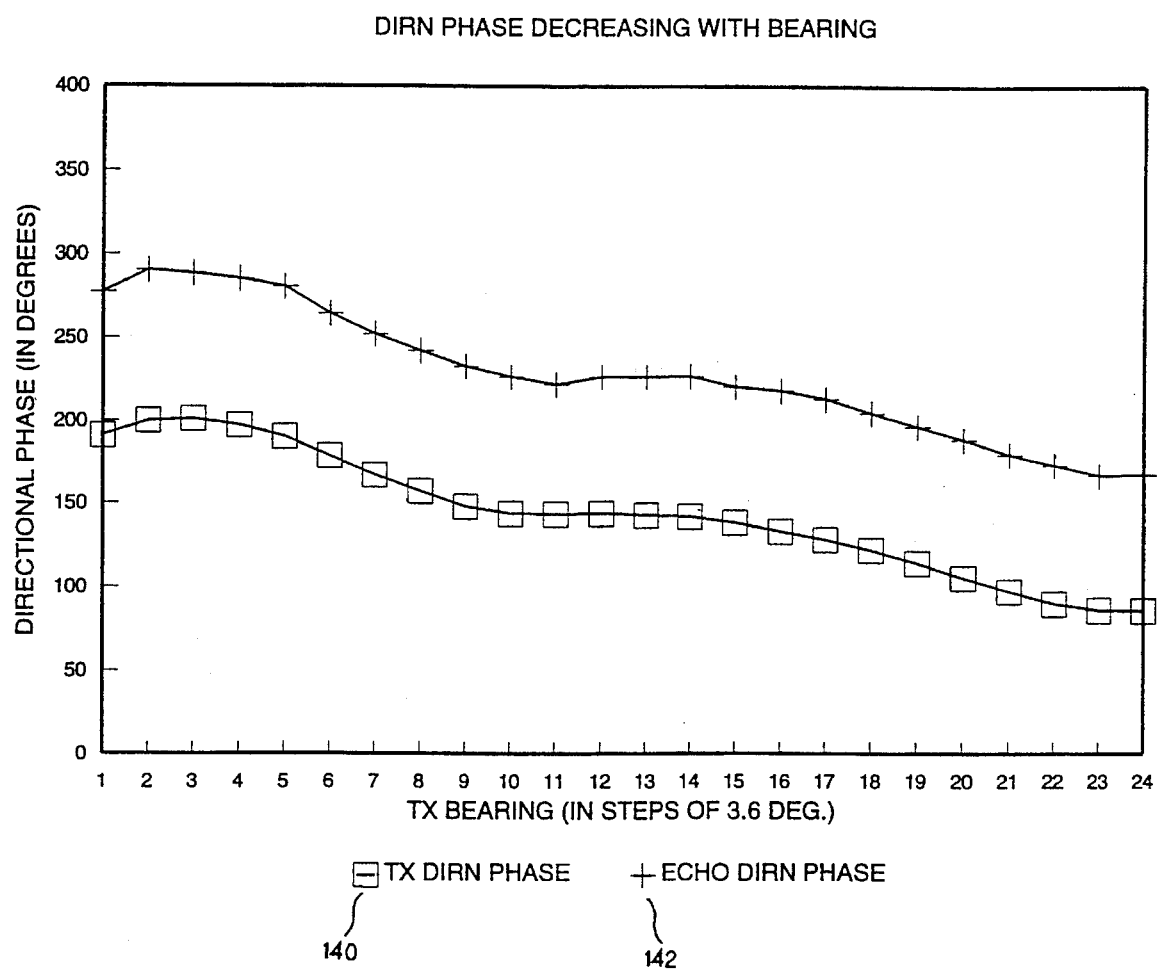

Plots of computed mean directional phases for the reflected echoes of FIG. 18(a) are shown in FIGS. 18(b) for the circular disc and analogous information for the small retangular plate are shown in FIGS. 19(a) and 19(b), respectively. FIGS. 18(c) and 19(c) are similar to FIGS. 18(b) and 19(b) except that the sense of signal phase variation with direction for the Neidlian wavefield has been reversed. In these Figures, square (□) symbols 140 represent the mean directional phase of the impinging wavefield, and plus (+) symbols 142 represent those of the echo which are always higher by the constant amounts. It is to be noted that the mean directional phases in FIGS. 18 and 19 have been computed also with the elements of the Neidlian transducer exchanged. Computer simulations for these two small reflectors confirm significant phase distortions due to diffraction effects from the edges, and these diffraction effects appear as the integral term on the right hand side of equation (10).

At first sight, such a result would seem to diminish the value of the Neidlian wavelet technique because it is upon the wavelet phase distortion which one would rely to determine a bearing angle for example. Fortunately, with the present invention there is a very simple way to overcome this problem using the Neidlian transducer. Such approach has applications also in removing phase distortion effects of the propagation medium.

FIG. 18(b) as noted shows a directional phase increasing with the angle of rotation for the transmitted Neidlian wavefield (square symbols 140). In the same figure, the mean directional phase for an echo from a circular disc is also shown (plus symbols 142).

Relating the directional phase of the echo with that of the transmitted wavefield directly would result in estimating a much larger than expected transmitter bearing position. This is illustrated at bearing angle value $B_1$ of FIG. 20, where hypothetical data now are considered for illustration. If however the sense in which the phase changes is reversed, as shown by the two curves labelled "reverse-phase" in FIG. 20, the phase curve for the echo continues to stay at higher values than that of the transmitted wavefield. For this reverse-phase configuration, relating the phase of the echo with that of the transmitted wavefield (assuming a large planar reflector) results in a much smaller than expected transmitter bearing angle or $B_2$ as in FIG. 20. By simply averaging bearings $B_1$ and $B_2$, we would obtain a position B which is much closer to the true position TP. One can thus see that the two opposite senses of phase increment with direction can lead us to a solution. It is possible to determine the direction of a small target or remove a propagation phase distortion using a Neidlian transducer of the present invention.

It is helpful first to consider how directional phase reversal as indicated in the figures can be achieved. The sense in which phase changes with direction angle can be reversed by either of two simple methods. For both methods, no new transducers need be introduced.

Method 1: The phase reversal is accomplished electronically, i.e., the waveforms driving the transducers are reversed or interchanged. Assuming that the electronic signals affect the wavefield in substantially the same way, reconnecting the signals in reverse fashion should theoretically result in interchanging the directional phase across the transducer axis of symmetry. Thus in FIG. 1, by interchanging the electronic signals produced by arbitrary waveform generators (element 50) and (element 56), the phase increments of the resulting wavefield are reversed in regard to direction. In practice some minor deviation from exact reversal will, of course, exist. For example, the phase of a wavefield generated from a single piezo film transmitter can increase slightly with direction even though it is expected to stay constant. Beyond the simple interchange of the signals, the signals may further be adjusted slightly to compensate for any such measured or known deviation. However, the two phase characteristics need not be an exact reversal of one another. So long as the phase increments remain monotonic with direction in each case, the technique remains useful. Using more transducers and signal generators, the phase characteristics become more readily subject to control.

Figure 15C:
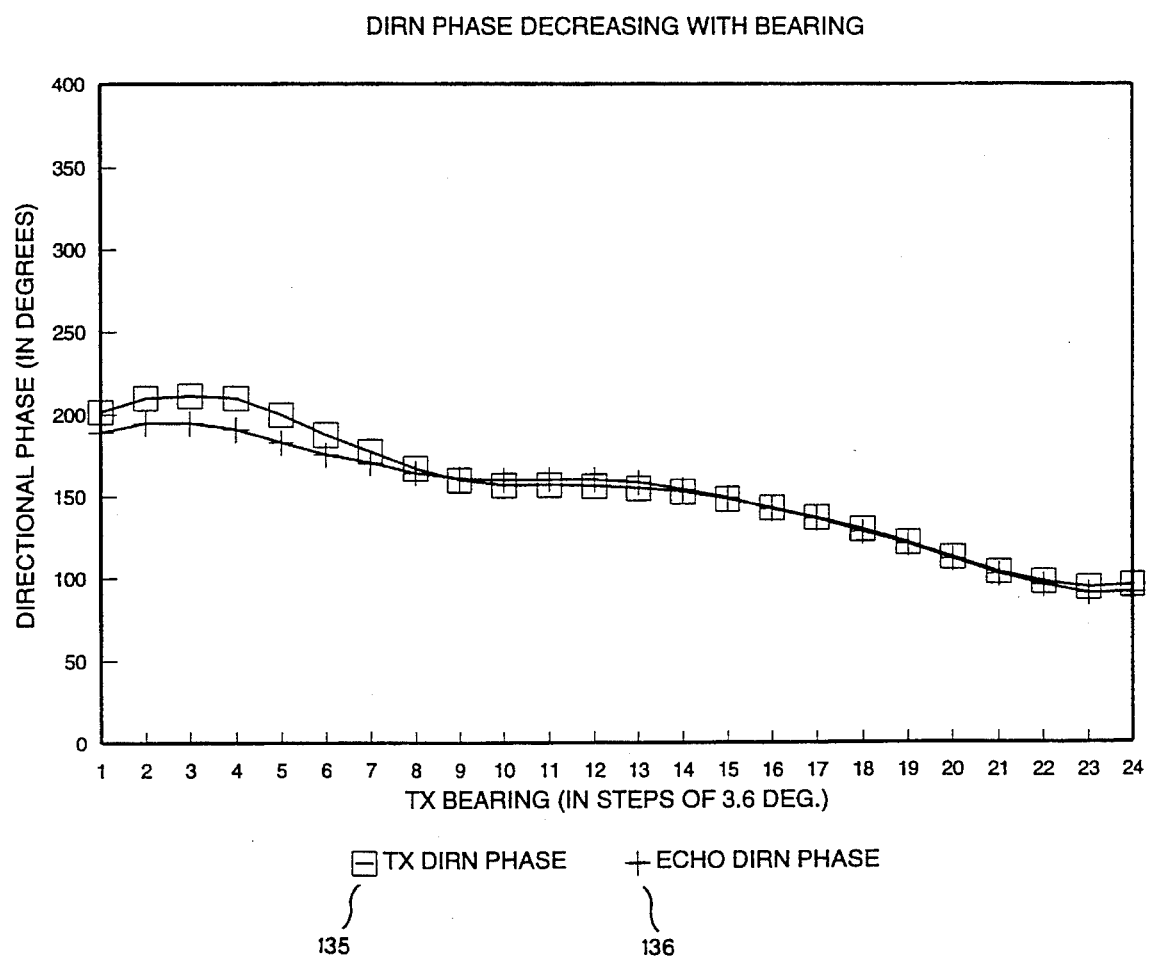

Method 2. Rather than electronically reversing the phase, a physical exchange is employed. Specifically the transducer of the present invention may be inverted or turned upside down. This method is especially applicable to a source emitting a wavefield whose phase changes essentially in a plane, as is the case in the embodiments described here. Accordingly, the piezo films 120 and 122 (FIG. 10(b)) are attached to the sheet of gasket material 126 (FIG. 10(b)) which is wrapped around the rotatable pole 127 (FIGS. 14(a) and (b)). The piezo films 120 and 122 together with the sheet of gasket material 126 can be easily removed from the rotatable pole 127, reversed or turned vertically upside down, and inserted back onto the pole 127. This reversal method is desirable once one has achieved some desired Neidlian wavefield in an original configuration. It prevents a situation where non-linear or non-symmetrical effects could bar achieving the desired reverse-phase characteristics. There must also be no requirement for a rapid switch from the original phase wavefield to a reverse-phase wavefield, and it therefore may be more convenient to use the previous method in many applications. Reverse-phase data shown in FIGS. 18(c), 19(c) and 15(c) for three different targets as identified in the figures were obtained following this method.

For any target whose dimensions are small enough so that the directional phase variation across its surface is negligible, the phase distortion upon the echo from an impinging Neidlian wavefield is a constant. This applies also to a Neidlian wavefield provided the directional phase variation across the target surface is small, as in the experiments described above (results shown as in FIGS. 18 and 19). This invariant property of the size-related phase distortion can then be used to obtain a better estimate of the true position by iteratively using data from both an original and phase-reversed wavefields. The same approach could of course be used to remove a propagation path-related phase distortion.

The iterative solution is begun by averaging the apparent bearing angles $B_1$ and $B_2$ (FIG. 20) to obtain a new estimated position B. This process is illustrated in steps 201 and 202 of a Flowchart 200 (FIGS. 21(a) and 21(b)). Variables used in Flowchart 200 and in FIG. 20 which end with subscripts 1 and 2 correspond to the original and reverse-phase wavefields respectively. The next step 203 calculates $\Delta P_1$ and $\Delta P_2$ according to formulae as provided, with example calculated magnitudes being graphically depicted in FIG. 20. The magnitude of $\Delta P_1$ in relation to that of $\Delta P_2$ depends on the position of B in relation to the true position TP as summarized below:

$$|\Delta P_1|>|\Delta P_2|,\ B<TP,\ |\Delta P_1|<|\Delta P_2|,\ B>TP,\ |\Delta P_1|=|\Delta P_2|,\ B=TP. \quad (13)$$

Relations (13) above hold as long as the directional phase increments are monotonic. They do not, however, necessarily have to be linear.

From the difference magnitudes of $\Delta P_1$ and $\Delta P_2$, calculated in step 203, a new quantity $\Delta P$ is calculated according to the relation shown in step 204. This quantity $\Delta P$ has an ideal magnitude which is non-zero as long as the estimated position B deviates from the true position TP. From $\Delta P$, new positions $B_1$ and $B_2$ are obtained following step 205 by computations shown. As a graphical illustration of how a new position $B_1$ is obtained, refer to FIG. 22 and start from point {a}. Moving up by an amount $\Delta P$, a point {b} is reached. From point {b}, the position is moved horizontally until the transmitted phase curve is encountered (point {c}). From here, the position is moved vertically until the horizontal x-axis is encountered resulting in bearing $B_1$. A graphical illustration of the path moved to obtain $B_2$ is similar and shown by arrows in FIG. 22, with the points {e}, {f} and {g} having corresponding significance. From these revised $B_1$ and $B_2$, a new B is obtained as shown and expressed mathematically in step 202 (FIG. 21(a)). The value $\Delta P$ is such that new position B always moves closer to the true position until a step 206 when an ambiguous region is reached limited by the accuracy of the experimental data.

Figure 20:
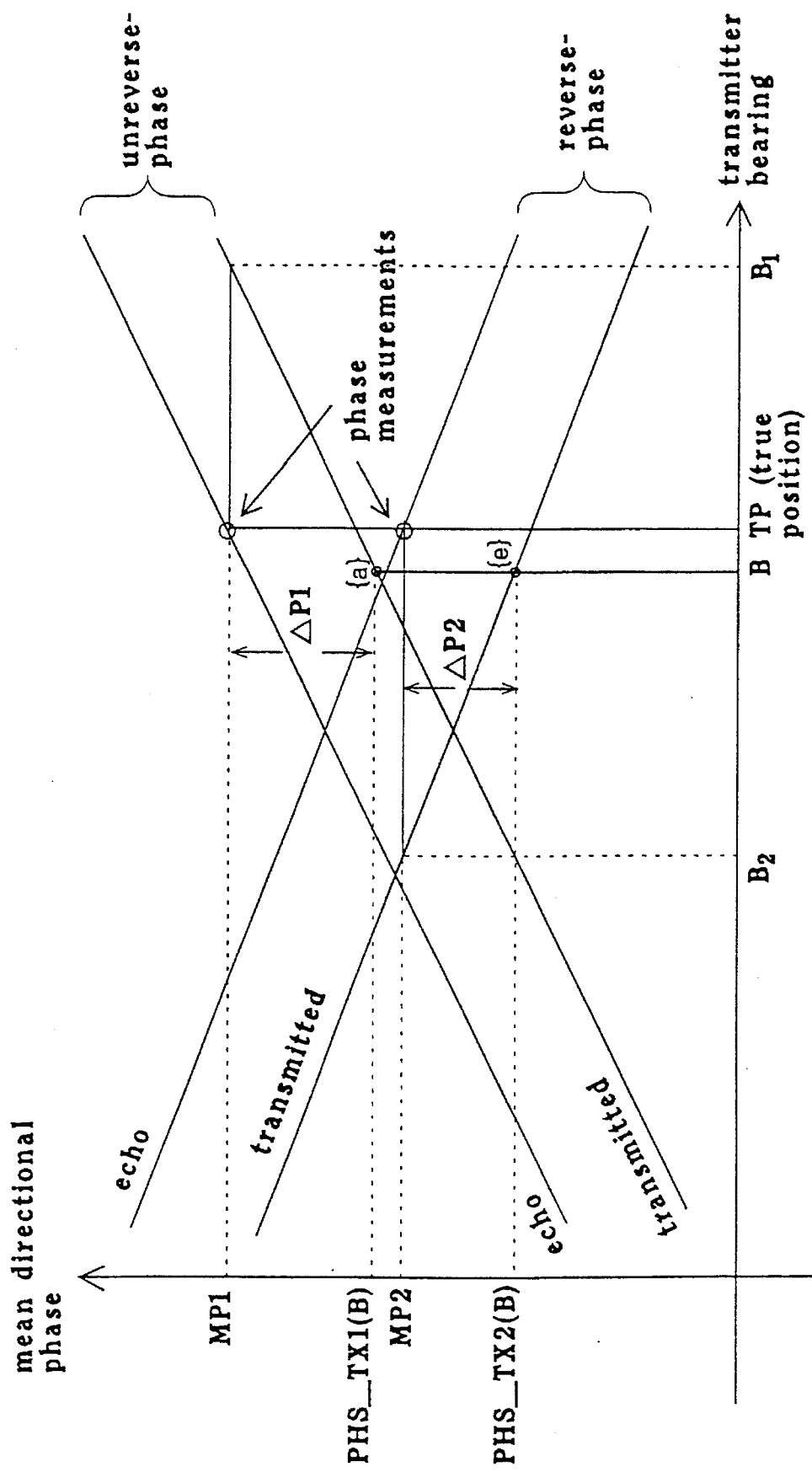
FIG. 20 is a plot of mean directional phase as a function of transmitter bearing for theoretical data from echo and transmitted signals.
Figure 21A:
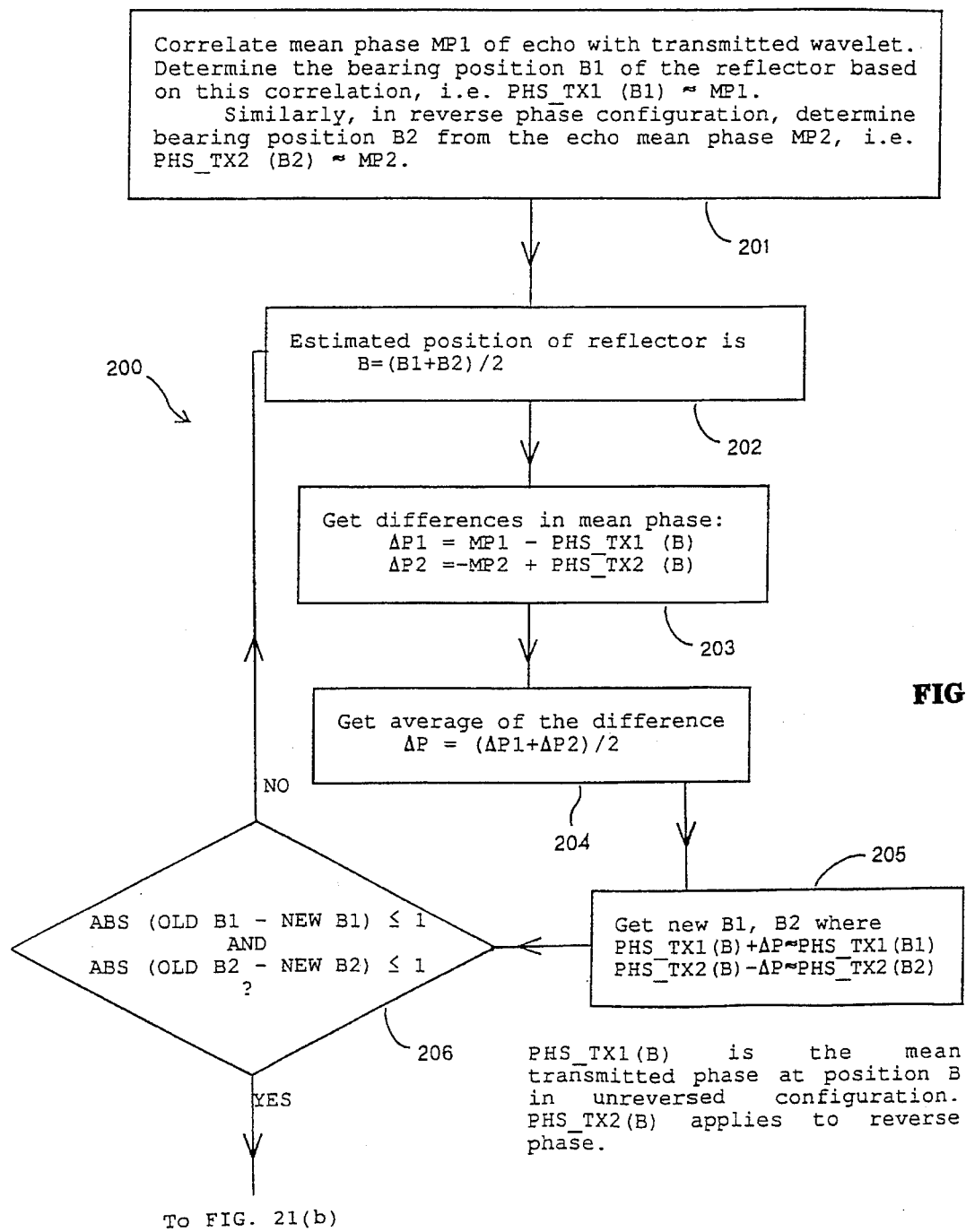
FIGS. 21(a) and 21(b) are schematic flow chart diagrams of an iterative process for determining target bearing.
Figure 22:
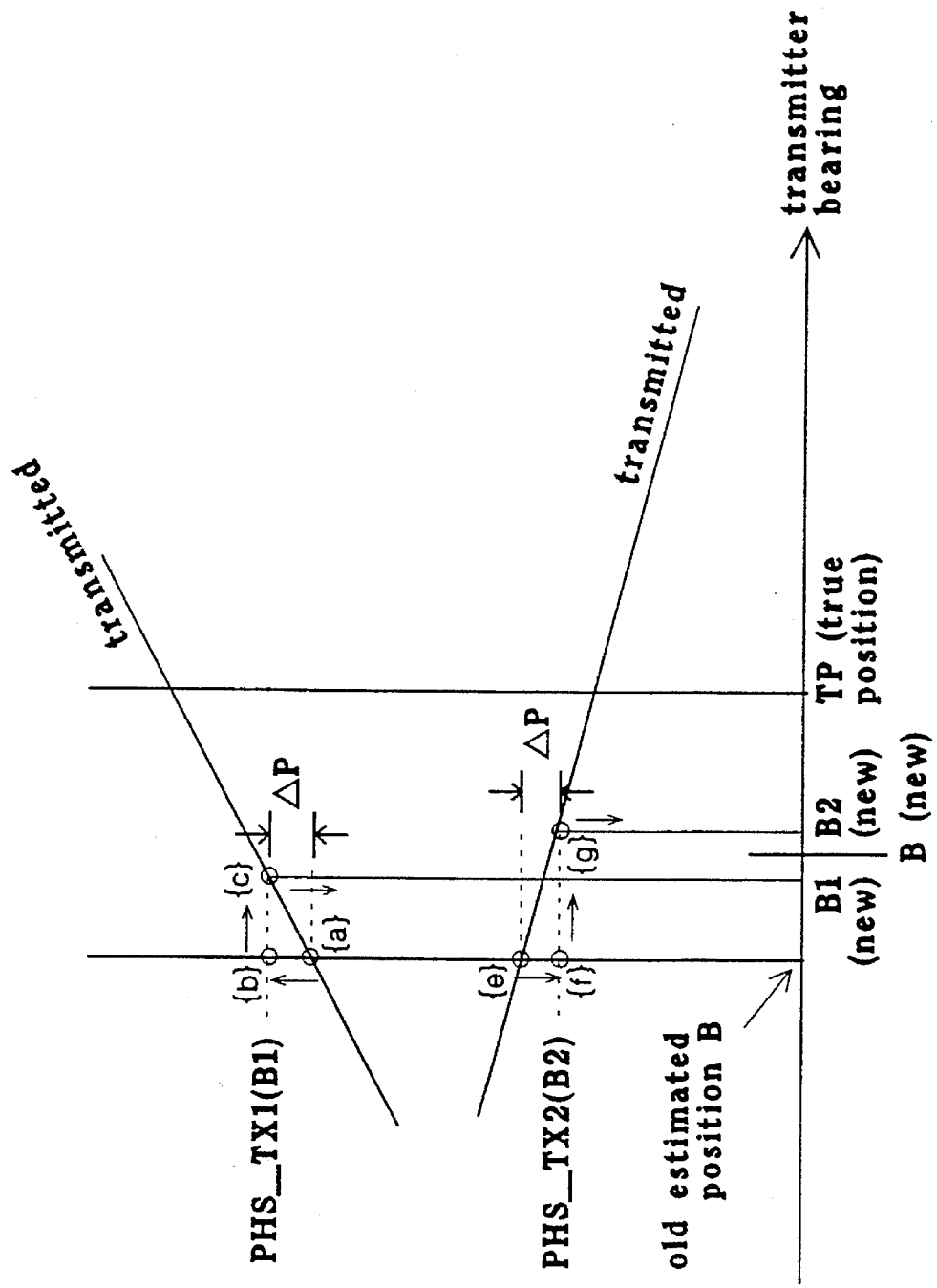
FIG. 22 is a plot of mean directional phase as a function of transmitter bearing obtained from the process of FIGS. 21(a) and 21(b).

It is to be emphasized again that the illustrations in FIGS. 20 and 22 assume for simplicity a linear change in mean directional phase with the transmitter bearing. However, the entire argument presented holds similarly for any monotonic change in phase.

Figure 21B:
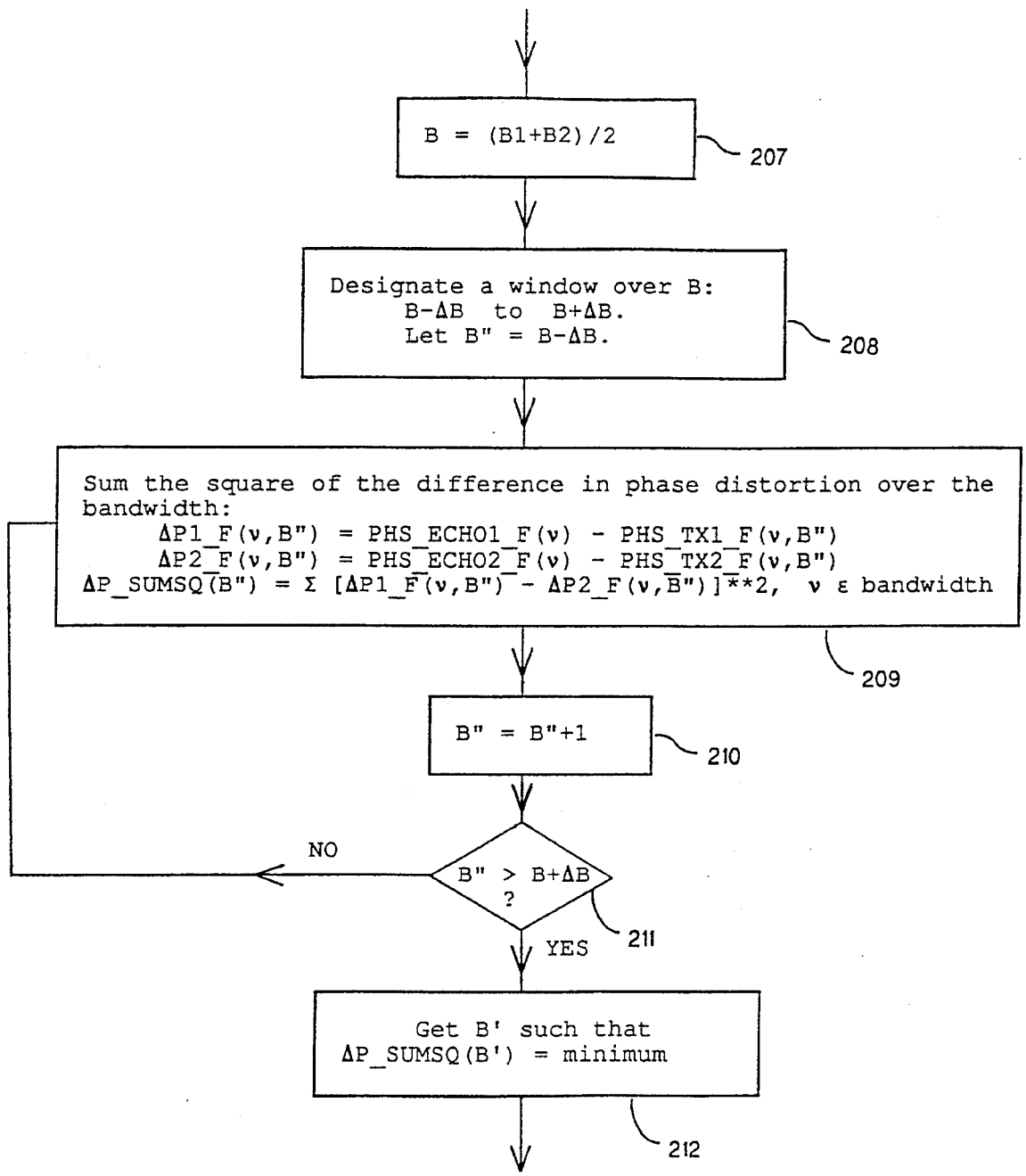

In FIG. 21(b), a second part of the flowchart, a refinement of solution is accomplished by performing steps 207, 208, 209 and 210 minimizing the square of the difference in phase distortion over the bandwidth. Computation is repeated over a range of positions in the neighborhood of the position B which was obtained from FIG. 21(a). Step 211 determines if the range of positions is exhausted. At this point, a step 212 indicates that the computed angular position B' is now the computed angular reflection position. The minimum square of the difference solution illustrated in FIG. 21(b) of the flow chart differs from that of FIG. 21(a), where only the mean phase is used. Nevertheless, the computational refinement shown in FIG. 21(b) is also based on the fact that phase distortion is the same regardless of the scheme of phase increments, and the least square method seeks to minimize any residual differences over the band of frequencies of interest.

Having described the invention above, various modifications of the techniques, procedures, material and equipment will be apparent to those skilled in the art. It is intended that all such variations within the scope and spirit of the appended claims be embraced thereby.

What is claimed is:

1. An echo location system, comprising:
    a transducer for generating a phase-encoded wavefield into a propagation medium, said wavefield having monotonically changing phase as a function of direction from the transducer;
    means for reversing the phase increments of said wavefield as a function of said direction to form a second phase-encoded wavefield; and
    a receiver for receiving reflections from each of the wavefields from an object in the medium.

2. The echo location system of claim 1, wherein:
    said means for reversing comprises means for electronically reversing the phase of said wavefield to form said second phase-encoded wavefield.

3. The echo location system of claim 1, wherein:
    said means for reversing comprises means for mechanically reversing the phase of said wavefield to form said second phase-encoded wavefield.

4. The echo location system of claim 1, further including:
    computer means for calculating and utilizing the mean directional phase over a band of frequency; and
    computer means for determining the position of the object from the received reflections.

5. The echo location system of claim 1, wherein the reflecting object imparts a distortion to the incident phase-encoded wavefields generated by said transducer.

6. The echo location system of claim 1, further including:
    computer means for determining the size of reflector from the distortion imparted to the phase-encoded wavefield by the reflector.

7. The echo location system of claim 1, further including:
    computer means for characterizing dispersive properties of the medium from the reflection received by said receiver.

8. The echo location system of claim 1, further including:
    computer means for characterizing dispersive properties of the medium from the reflection received by said receiver by removing any constant phase component therefrom.

9. A method of locating an object based on echoes reflected therefrom, comprising the steps of:
    generating at a source position a phase-encoded wavefield into a propagation medium containing the object, said wavefield having monotonically changing phase as a function of direction from its source position;
    reversing the sense of phase changes of said wavefield as a function of said direction to form a second phase-encoded wavefield; and
    receiving reflections by the object from each of the wavefields in the medium.

10. The method of claim 9, wherein said step of reversing comprises the step of:
    electronically reversing the phase of said wavefield to form said second phase-encoded wavefield.

11. The method of claim 9, wherein said step of reversing comprises the step of:
    mechanically reversing the phase of said wavefield to form said second phase-encoded wavefield.

12. The method of claim 9, further including the step of:
    determining the position of the object from the received reflections.

13. The method of claim 9, wherein the reflecting object imparts a distortion to the incident phase-encoded wavefields generated during said step of generating.

14. The method of claim 13, further including the step of:
    determining the size of object from the distortion imparted to the phase-encoded wavefield by the object.

15. The method of claim 9, further including the step of:
    characterizing dispersive properties of the medium from the reflection received during said step of receiving.

16. The method of claim 9, further including the step of:
    characterizing dispersive properties of the medium from the reflection received during said step of receiving by removing any constant phase component therefrom.

17. A method of echo location of an object based on a directionally-dependent phase characteristic of an emitted signal, comprising the steps of:
    imparting, by at least two member transducer elements referenced to a source point, a composite wavefield of varying and distinguishable phase character other than time delays over a range of directions from the source point;
    reversing the phase character; and
    repeating said step of imparting using the reversed phase character.

18. The method of claim 17, where at least two wavefields having substantially reversed nature are used to eliminate a phase distortion substantially constant in both same wavefields.

19. The method of claim 18, wherein the constant phase distortion which is eliminated is used to characterize some element encountered by the propagating wavefields.

20. The method of claim 19, where the element to be characterized is the propagation medium.

21. The method of claim 19, where the element to be characterized relates to the size of a reflective target.

22. The method of claim 17, wherein the wavefield phase character reversal is achieved by controlling the transducer driving signals.

23. The method of claim 17, wherein the wavefield phase character reversal is achieved by physically interchanging transducer elements prior to developing the second wavefield.

24. The method of claim 17, wherein an iterative algorithm is performed for computational convergence to substantially the true reflector direction.

25. The method of claim 17, wherein an iterative algorithm is performed for computational convergence to substantially the constant phase distortion characterizing the propagation medium.

26. A navigation system, comprising:
    a transducer for generating a phase-encoded wavefield into a propagation medium, said wavefield having monotonically increasing phase increments as a function of direction from the transducer;
    means for reversing the phase increments of said wavefield as a function of said direction to form a second phase-encoded wavefield; and a receiver for receiving signals from the emitted wavefields indicating the location of said receiver in the medium.

27. The navigation system of claim 26, wherein:

said means for reversing comprises means for electronically reversing the phase of said wavefield to form said second phase-encoded wavefield.

28. The navigation system of claim 26, wherein:

said means for reversing comprises means for mechanically reversing the phase of said wavefield to form said second phase-encoded wavefield.

29. The navigation system of claim 26, further including:

computer means for calculating and utilizing the mean directional phase over a band of frequency; and computer means for determining the location of said receiver from the received signals.

30. The navigation system of claim 26, further including:

computer means for characterizing dispersive properties of the medium from the signals received by said receiver.

31. The navigation system of claim 26, further including:

computer means for characterizing dispersive properties of the medium from the signals received by said receiver by removing any constant phase component therefrom.

32. A method of locating the position of a receiver, comprising the steps of:

generating at a source position a phase-encoded wavefield into a propagation medium containing the object, said wavefield having monotonically increasing phase increments as a function of direction from its source position;

reversing the phase increments of said wavefield as a function of said direction to form a second phase-encoded wavefield; and receiving a signal from said source from each of the wavefields in the medium.

33. The method of claim 32, wherein said step of reversing comprises the step of:

electronically reversing the phase of said wavefield to form said second phase-encoded wavefield.

34. The method of claim 32, wherein said step of reversing comprises the step of:

mechanically reversing the phase of said wavefield to form said second phase-encoded wavefield.

35. The method of claim 32, further including the step of:

characterizing dispersive properties of the medium from the signal received during said step of receiving.

36. The method of claim 32, further including the step of:

characterizing dispersive properties of the medium from the signal received during said step of receiving by removing any constant phase component therefrom.

37. A method of locating the position of an object based on a directionally-dependent phase characteristic of an emitted signal, comprising the steps of:

imparting, by at least two transducer elements referenced to a source point in a propagation medium containing the object, a composite wavefield of varying and distinguishable phase character other than time delays over a range of directions from the source point;

reversing the phase character; and repeating said step of imparting using the reversed phase character.

38. The method of claim 37, where at least two wavefields having substantially reversed nature are used to eliminate a phase distortion substantially constant in both same wavefields.

39. The method of claim 38, wherein the constant phase distortion which is eliminated is used to characterize some element encountered by the propagating wavefields.

40. The method of claim 39, where the element to be characterized is the propagation medium.

41. The method of claim 37, wherein the wavefield phase character reversal is achieved by controlling the transducer driving signals.

42. The method of claim 37, wherein the wavefield phase character reversal is achieved by physically interchanging transducer elements prior to developing the second wavefield.

43. The method of claim 37, wherein an iterative algorithm is performed for computational convergence to substantially the true object position.

* * * * *

UNITED STATES PATENT AND TRADEMARK OFFICE
CERTIFICATE OF CORRECTION

PATENT NO. : 5,557,583

DATED : SEPTEMBER 17, 1996

INVENTOR(S) : STEPHEN T. HA AND NORMAN S. NEIDELL

It is certified that error appears in the above-identified patent and that said Letters Patent is hereby corrected as shown below:

Column 5, line 19, please delete "$K\Gamma$" and insert therefor -- $\kappa\theta$ --.

Column 5, line 21, please delete "$K\Gamma$" and insert therefor -- $\kappa\theta$ --.

Column 6, line 25, please delete "=, 1" and insert therefor ---=1 ,--.

Signed and Sealed this

Third Day of December, 1996

Attest:

BRUCE LEHMAN

Attesting Officer     Commissioner of Patents and Trademarks